US010118633B2

(12) United States Patent
Gibson

(10) Patent No.: US 10,118,633 B2
(45) Date of Patent: Nov. 6, 2018

(54) LOAD CARRIER WITH MODE CHANGER

(71) Applicant: DOREL HOME FURNISHINGS, INC., Wright City, MO (US)

(72) Inventor: William R Gibson, Kent, OH (US)

(73) Assignee: Dorel Home Furnishings, Inc., Wright City, MO (US)

( * ) Notice: Subject to any disclaimer, the term of this patent is extended or adjusted under 35 U.S.C. 154(b) by 323 days.

(21) Appl. No.: 14/997,190

(22) Filed: Jan. 15, 2016

(65) Prior Publication Data
US 2016/0207555 A1 Jul. 21, 2016

Related U.S. Application Data

(60) Provisional application No. 62/103,965, filed on Jan. 15, 2015.

(51) Int. Cl.
  B62B 3/02 (2006.01)
  B62B 5/06 (2006.01)
  B62B 1/00 (2006.01)
  B62B 1/12 (2006.01)

(52) U.S. Cl.
  CPC ............ *B62B 3/022* (2013.01); *B62B 1/002* (2013.01); *B62B 1/12* (2013.01); *B62B 5/06* (2013.01); *B62B 5/067* (2013.01); *B62B 2205/12* (2013.01); *B62B 2205/32* (2013.01); *B62B 2206/006* (2013.01)

(58) Field of Classification Search
  CPC .......... B62B 3/022; B62B 5/06; B62B 5/067; B62B 1/002; B62B 1/12; B62B 2205/12; B62B 2205/32; B62B 2206/006
  See application file for complete search history.

(56) References Cited

U.S. PATENT DOCUMENTS

| 2,363,619 | A | 11/1944 | Prieto |
| 2,598,168 | A | 5/1947 | Hooz et al. |
| 2,786,692 | A | 8/1954 | Timpson |
| 3,785,669 | A | 1/1974 | Doheny |
| 3,873,118 | A | 3/1975 | Takagi |
| 4,227,709 | A | 10/1980 | Gradwohl et al. |
| 4,358,124 | A | 11/1982 | Geschwender |
| 4,561,674 | A | 12/1985 | Alessio |
| 4,659,096 | A | 4/1987 | Leimgruber |
| 4,681,330 | A | 7/1987 | Misawa |
| 4,921,270 | A | 5/1990 | Schoberg |
| 5,207,439 | A | 5/1993 | Mortenson |
| 5,476,282 | A | 12/1995 | Dahl |
| 5,536,034 | A | 7/1996 | Miller |
| 5,709,400 | A | 1/1998 | Bonnier et al. |
| 5,779,251 | A | 7/1998 | Meier |

(Continued)

FOREIGN PATENT DOCUMENTS

DE 6751061 U 1/1969

OTHER PUBLICATIONS

International Search Report and Written Opinion, International Application No. PCT/US2014/046490, dated Nov. 6, 2014, 8 pages.

(Continued)

*Primary Examiner* — Brian L Swenson
(74) *Attorney, Agent, or Firm* — Barnes & Thornburg LLP

(57) ABSTRACT

A multi-mode load carrier is convertible to assume a storage mode, a cart mode, and a hand-truck mode. The load carrier includes a rolling base and a base pusher having a handgrip.

27 Claims, 18 Drawing Sheets

(56) References Cited

U.S. PATENT DOCUMENTS

| | | | |
|---|---|---|---|
| 5,803,471 A * | 9/1998 | DeMars | B62B 1/125 |
| | | | 280/40 |
| 5,810,373 A | 9/1998 | Miranda | |
| 6,053,514 A | 4/2000 | Su | |
| 6,053,515 A | 4/2000 | Kelley | |
| 6,234,497 B1 * | 5/2001 | Stahler, Sr. | B62B 1/002 |
| | | | 280/47.29 |
| 6,273,438 B1 | 8/2001 | Prapavat | |
| 6,308,967 B1 | 10/2001 | Stallbaumer et al. | |
| 6,328,319 B1 | 12/2001 | Stahler, Sr. | |
| 6,364,328 B1 | 4/2002 | Stahler, Sr. | |
| 6,419,244 B2 | 7/2002 | Meabon | |
| 6,880,835 B2 | 4/2005 | Tornabene et al. | |
| 6,945,545 B2 | 9/2005 | Celli | |
| 7,168,712 B2 | 1/2007 | Celli | |
| 7,600,765 B2 | 10/2009 | Tsai | |
| 7,784,816 B2 | 8/2010 | Jian et al. | |
| 7,819,409 B2 | 10/2010 | Chang | |
| 8,091,916 B2 | 1/2012 | Shapiro | |
| 8,100,430 B2 | 1/2012 | Meyers et al. | |
| 8,465,046 B2 | 6/2013 | Meyers et al. | |
| 9,096,249 B2 * | 8/2015 | Gibson | B62B 1/002 |
| 9,211,894 B2 | 12/2015 | Gibson | |
| 9,616,907 B1 * | 4/2017 | Gibson | B62B 1/12 |
| 9,637,149 B1 * | 5/2017 | Wang | B62B 1/002 |
| 9,688,298 B1 * | 6/2017 | Su | B62B 1/002 |
| 2002/0020989 A1 * | 2/2002 | Krawczyk | B62B 1/002 |
| | | | 280/651 |
| 2003/0075887 A1 | 4/2003 | Malone, Jr. | |
| 2004/0201186 A1 | 10/2004 | Tornabene et al. | |
| 2004/0256818 A1 | 12/2004 | Amsili | |
| 2008/0203687 A1 | 8/2008 | Meyers et al. | |
| 2010/0253025 A1 | 10/2010 | Smith | |
| 2012/0153587 A1 * | 6/2012 | Ryan | B62B 1/12 |
| | | | 280/47.27 |
| 2012/0286498 A1 * | 11/2012 | Baldemor | B62B 1/002 |
| | | | 280/651 |
| 2015/0137487 A1 * | 5/2015 | Su | B62B 3/022 |
| | | | 280/655 |

OTHER PUBLICATIONS

International Search Report and Written Opinion issued in connection with International Application No. PCT/US2016/013699, completed Mar. 15, 2016, 9 pages.

"Cosco Shifter Multi-Position Folding Hand Truck and Cart" uploaded by DorelOnline, Jun. 10, 2014, available on the internet at https://www.youtube.com/watch?v=nbdrpvBiKo; entire video.

* cited by examiner

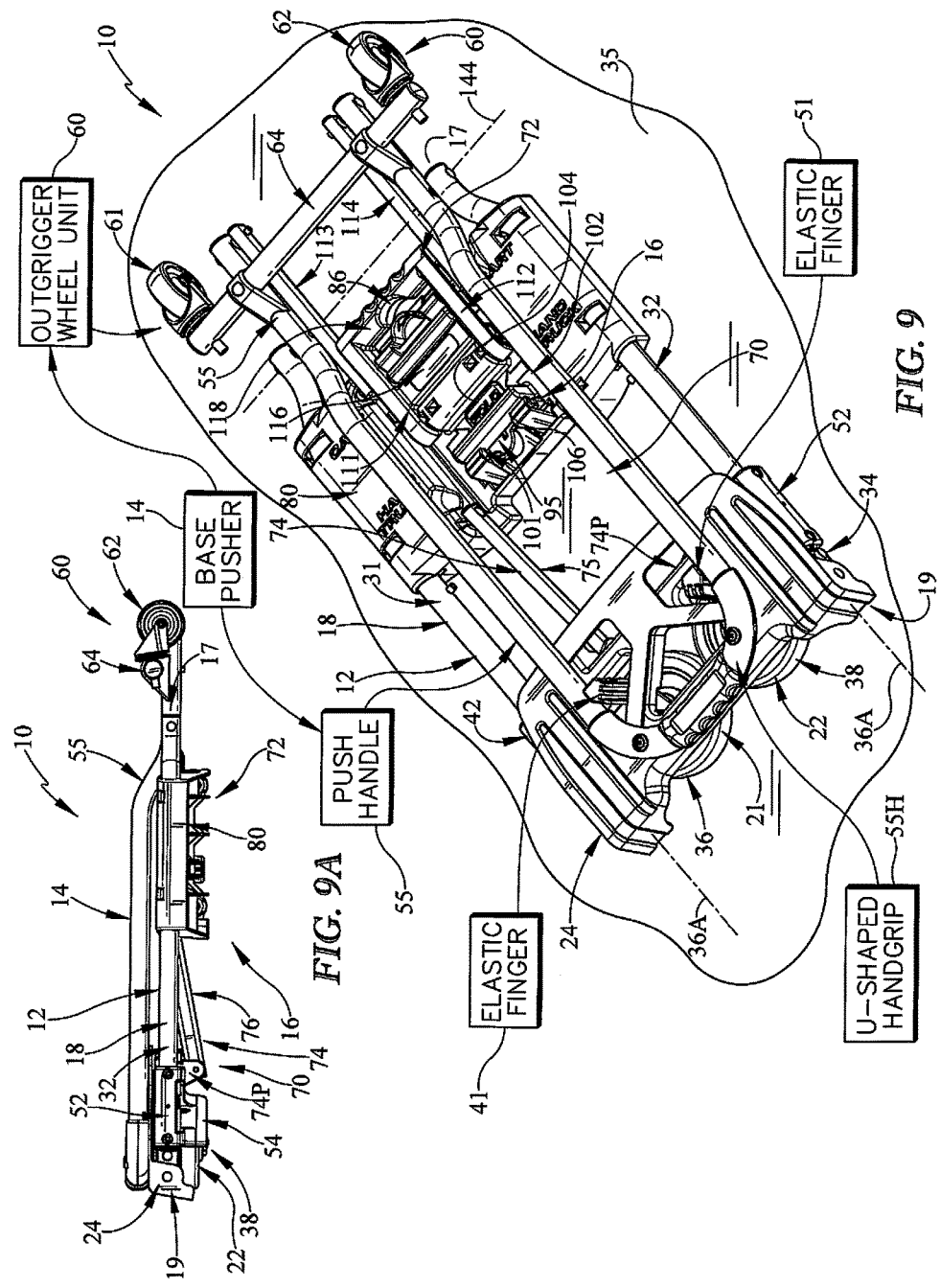

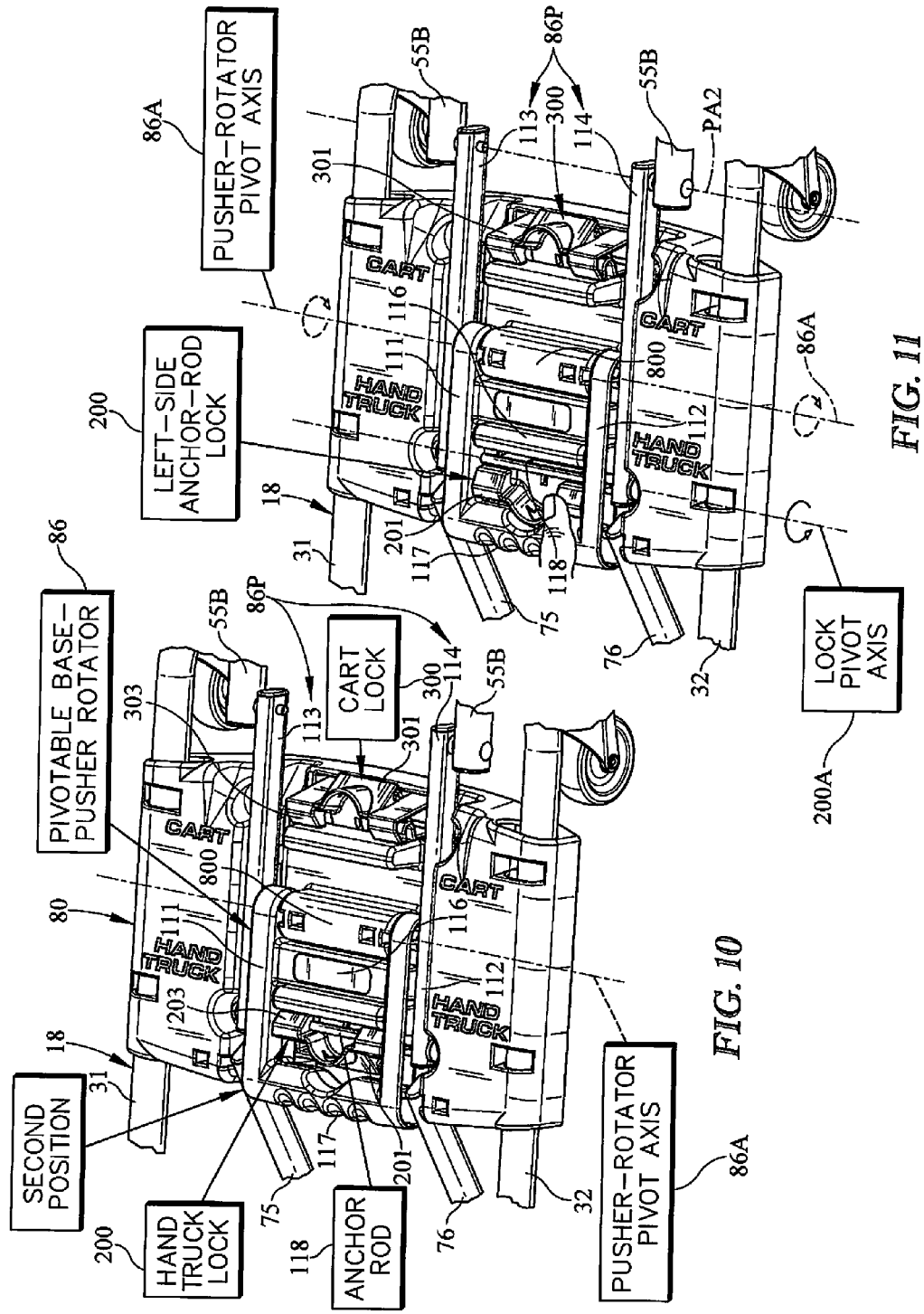

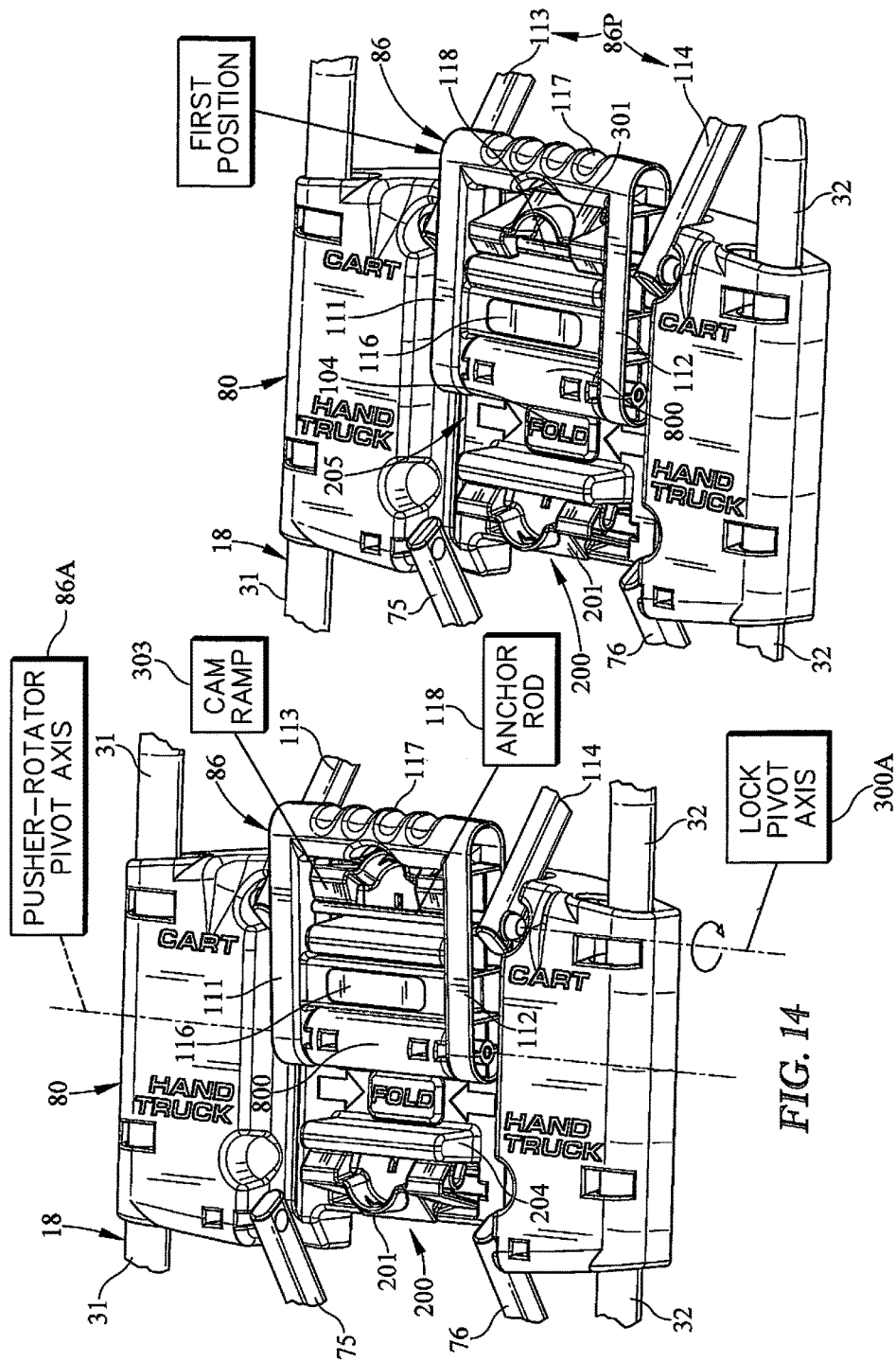

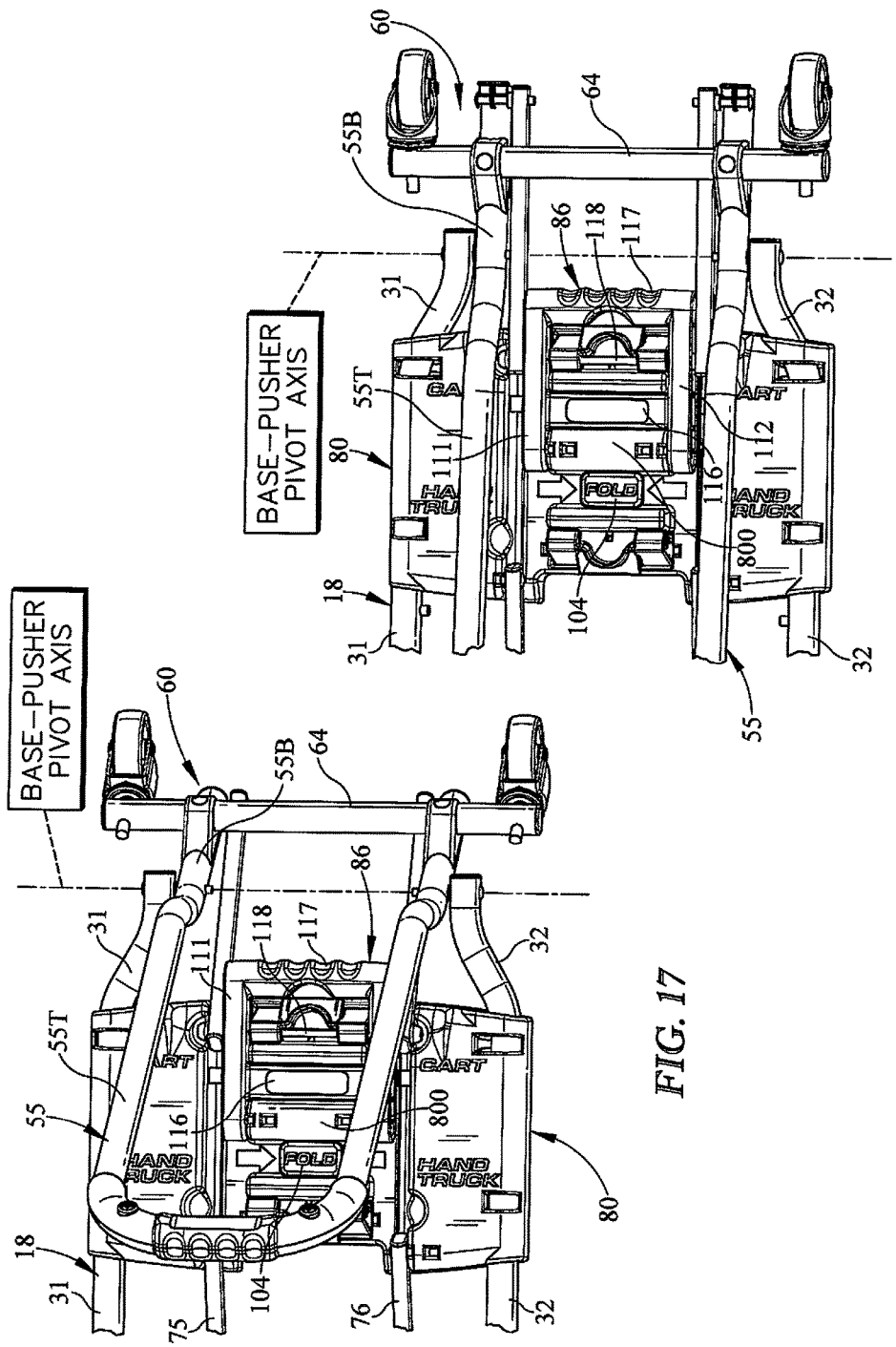

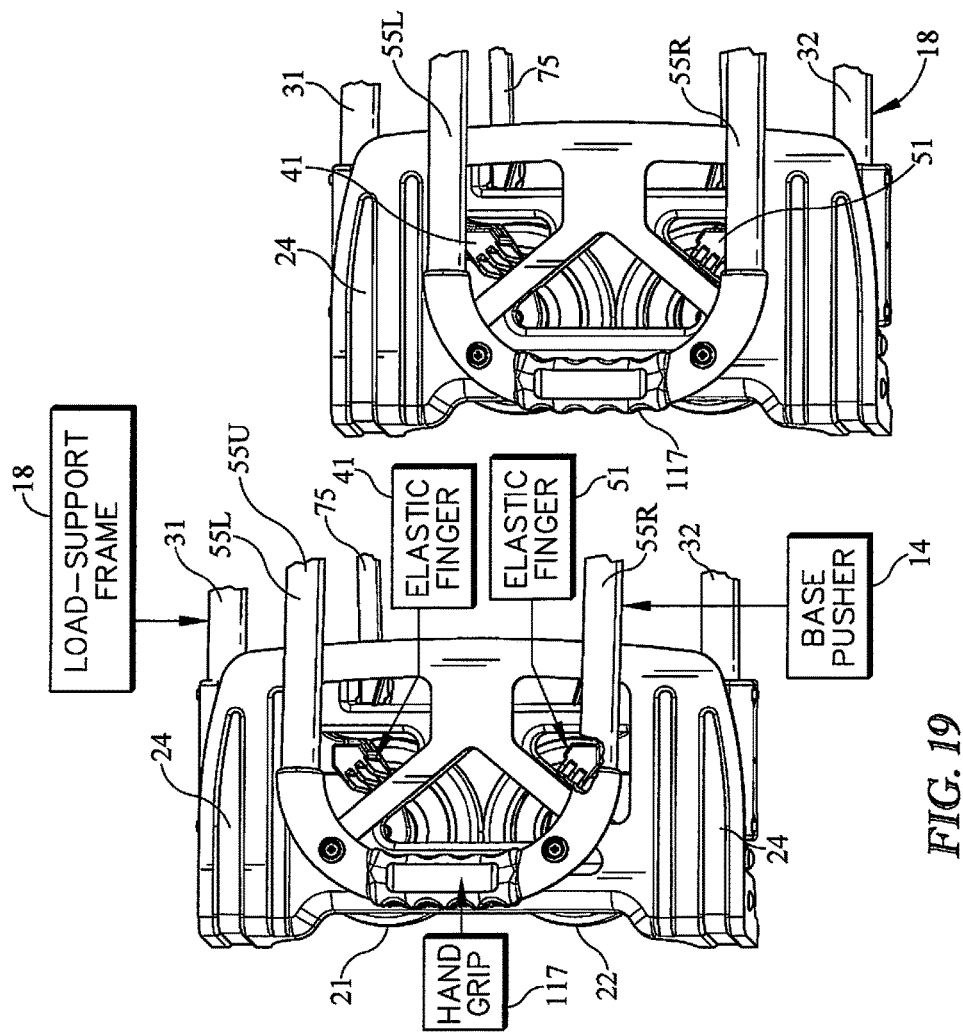

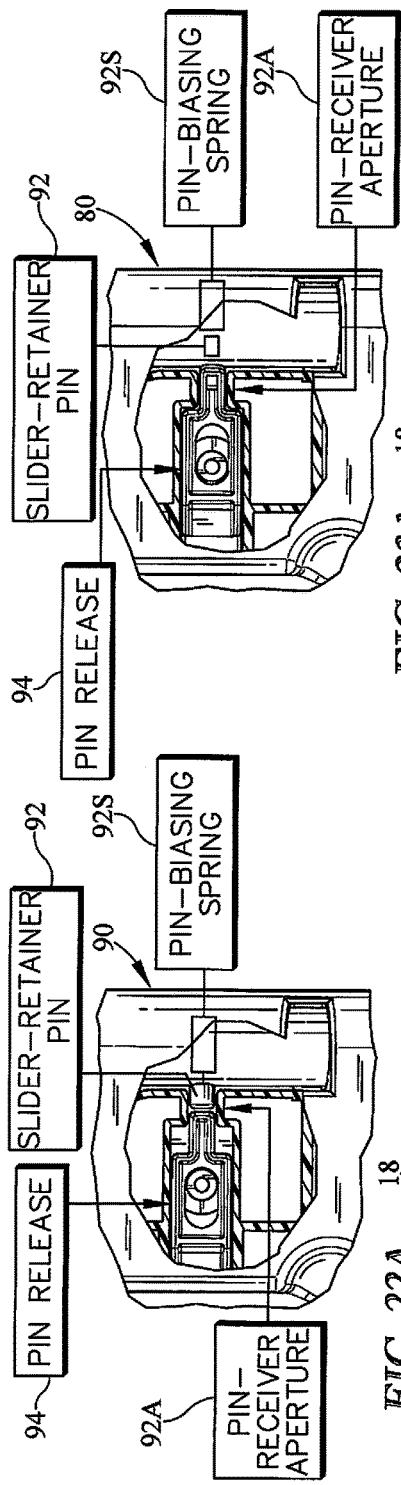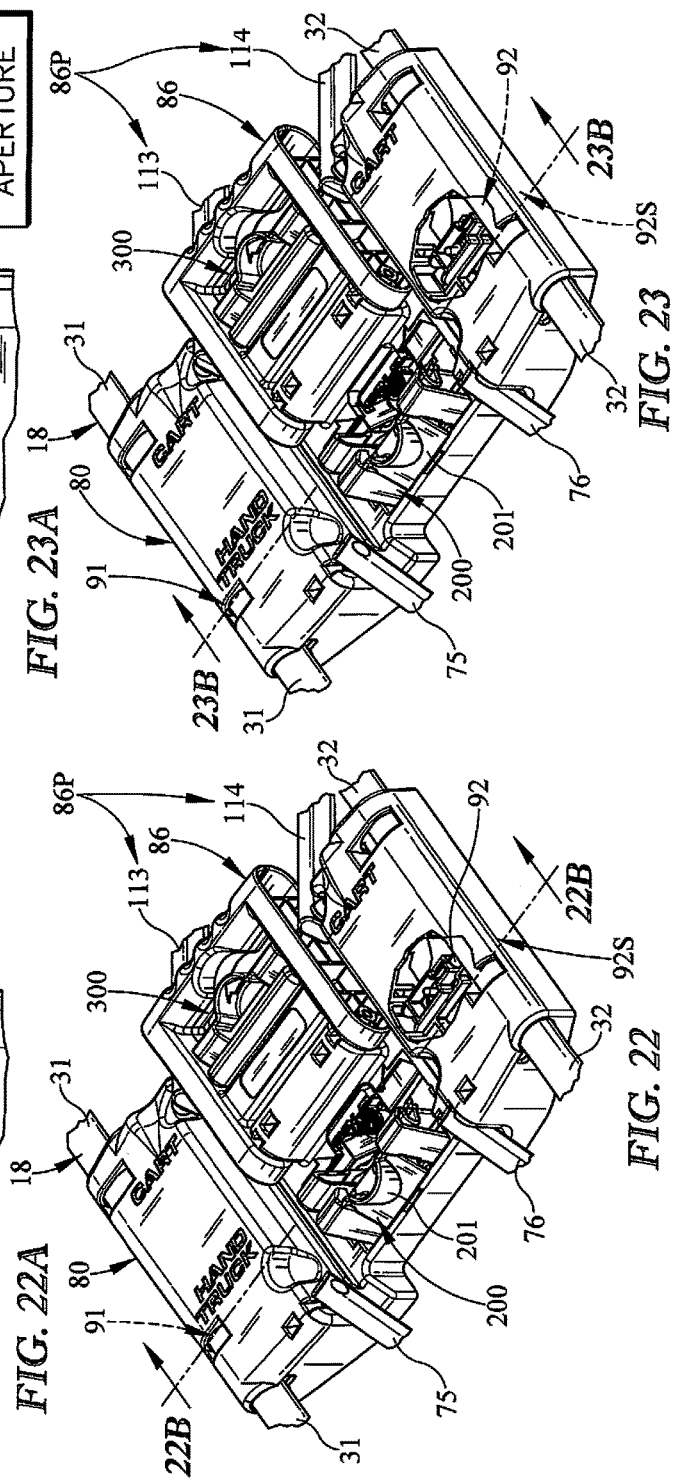
FIG. 22A  FIG. 23A
FIG. 22  FIG. 23

LOAD CARRIER WITH MODE CHANGER

PRIORITY CLAIM

This application claims priority under 35 U.S.C. § 119(e) to U.S. Provisional Application No. 62/103,965, filed Jan. 15, 2015, which is expressly incorporated by reference herein.

BACKGROUND

The present disclosure relates to a load carrier and particularly to a load carrier with wheels that can be collapsed to assume a compact storage mode. More particularly, the present disclosure relates to a wheeled load carrier that can be reconfigured in the field by a user to function in two operating modes.

SUMMARY

According to the present disclosure, a collapsible load carrier includes a rolling base and a base pusher mounted on the rolling base for movement relative to the rolling base. In illustrative embodiments, the collapsible load carrier further includes a load-carrier mode changer coupled to the rolling base and to the base pusher. The mode changer is configured to be operated by a user to pivot the base pusher relative to the rolling base and to pivot left and right front wheel units of the rolling base relative to companion wheel-support rails of the rolling base from a folded storage position to an unfolded rolling position.

In illustrative embodiments, the rolling base comprises a load-support frame including left and right wheel-support rails. The rolling base also includes a left front wheel unit mounted on the left wheel-support rail for pivotable movement between a folded storage position and an unfolded rolling position and a right front wheel unit mounted on the right wheel-support rail for pivotable movement between a folded storage position and an unfolded rolling position.

In illustrative embodiments, the base pusher is mounted on the rails for pivotable movement relative to the load-support frame about a base-pusher pivot axis. The base pusher includes a top portion having a handgrip and extending above the base-pusher axis and a bottom portion extending below the base-pusher axis and mating with the mode changer. The mode changer is coupled at a rear end to the lower portion of the pivotable base pusher and at a front end to the pivotable left and right front wheel units.

In illustrative embodiments, the load-carrier mode changer is coupled to the rolling base and to the base pusher and configured to provide means for converting the load carrier either to a flat storage mode, a front-and-rear-wheel cart mode, or a 2-wheel hand-truck mode at the option of a user without tools. The mode changer includes a front linkage coupled to the front wheel units and arranged to slide on the wheel-support rails of the load-support frame. The mode changer also includes a rear linkage pivotably coupled to each of the front linkage and to the pivotable base pusher.

In illustrative embodiments, the front linkage includes a spreader driver mounted for back-and-forth sliding movement on the wheel-support rails and a wheel spreader coupled to the front wheel units and to the slidable spreader driver. The rear linkage includes a base-pusher rotator pivotably coupled to the slidable spreader driver and a push rod pivotably coupled to the base-pusher rotator and to the pivotable base pusher.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIGS. 5-9 illustrate a folding sequence showing pivoting movement of the base pusher and of the left and right front wheel units as the load carrier is changed from the 2-wheel hand-truck mode first to the front-and-rear wheel cart mode and then to the flat storage mode;

FIG. 5 is a perspective view of the load carrier in the 2-wheel hand-truck mode and showing that the pivotable base-pusher rotator is mated with the left-side anchor-rod (hand-truck) lock to retain the base-pusher rotator in the SECOND POSITION on the spreader driver to establish the 2-wheel hand-truck mode of the load carrier;

FIG. 5A is a side elevation view of the load carrier of FIG. 5;

FIG. 6 is a perspective view of the load carrier of FIG. 5 in a transition mode after a user has manually operated the left-side anchor-rod (hand-truck) lock to free the base-pusher rotator to pivot about the pusher-rotator pivot axis showing rearward pivoting movement of the base-pusher rotator about the pusher-rotator pivot axis to cause forward pivoting movement of the base pusher about the base-pusher pivot axis toward the base-pusher rotator;

FIG. 6A is a reduced-size, side elevation view of the load carrier of FIG. 6;

FIG. 7 is a perspective view of the load carrier of FIGS. 5 and 6 in the front-and-rear-wheel cart mode and showing that the pivotable base-pusher rotator is mated with the right-side anchor-rod (cart) lock to retain the base-pusher rotator in the FIRST POSITION on the spreader driver to establish the front-and-rear-wheel cart mode of the load carrier and to expose the FOLD button located next to a central pusher-rotator mount included in the spreader driver so that a user can push downwardly on the exposed FOLD button to unlock a spreader-driver lock associated with the spreader driver so that the spreader driver is free to slide on the horizontal wheel-support rails included in the load-support frame of the rolling base during a folding sequence shown in FIGS. 7, 8, and 9;

FIG. 7A is a reduced-size side elevation view of the load carrier of FIG. 7;

FIG. 8 is a perspective view of the load carrier of FIGS. 5-7 during downward pivoting movement of the base pusher about the base-pusher pivot axis from the upright cart position toward a position on the underlying load-support frame of the rolling base and showing pivoting movement of each of the left and right front wheel units;

FIG. 8A is a reduced-size side elevation view of the load carrier in FIG. 8;

FIG. 9 is a perspective view of the load carrier of FIGS. 5-8 in the flat storage mode shown in FIG. 1A and showing the base pusher in a stored position on top of the load-support frame of the rolling base and the left and right front wheel units in their folded storage positions under a U-shaped handgrip included in the base pusher and also showing that an elastic finger included in the left wheel unit engages a left leg of the base pusher while an elastic finger included in the right wheel unit engages a right leg of the base pusher to retain the base pusher in the stored position;

FIG. 9A is a reduced-size side elevation view of the load carrier of FIG. 9;

FIG. 10 is a perspective view of the load-carrier mode changer showing the pivotable base-pusher rotator locked in the SECOND POSITION on the spreader driver due to mating of the left-side anchor-rod (hand truck) lock with the anchor rod in the base-pusher rotator when the load carrier is in 2-wheel hand-truck mode;

FIG. 11 is a view of the load-carrier mode changer similar to FIG. 10 showing that a user has pivoted the spring-loaded left-side anchor-rod lock in a counterclockwise direction about a left-side lock pivot axis to release the anchor rod of the base-pusher rotator to free the base-pusher rotator for clockwise pivoting movement about the pusher-rotator pivot axis;

FIG. 14 is a view of the load-carrier mode changer similar to FIGS. 10-13 showing that the spring-loaded right-side anchor-rod (cart) lock has been pivoted away from the rotator mount due to camming engagement of the moving anchor rod on the cam ramp of the right-side anchor-rod (cart) lock;

FIG. 15 is a view of the load-carrier mode changer similar to FIGS. 10-14 showing the base-pusher rotator locked in the FIRST POSITION on the spreader driver due to mating of the right-side anchor-rod (cart) lock with the anchor rod in the base-pusher rotator when the load carrier is in the front-and-rear-wheel hand-truck mode;

FIGS. 16-21 illustrate a folding sequence showing pivoting movement of the base pusher as the load carrier is changed from the front-and-rear wheel cart mode to the flat-storage mode after the FOLD button has been pressed by a user to unlock the slidable spreader driver so that it can slide on the two wheel-support rails included in the load-support frame away from the front wheels;

FIG. 16 is an aerial perspective view looking down on the load carrier in the front-and-rear wheel cart mode;

FIG. 17 is a perspective view of the load carrier during a first stage of downward pivoting movement of the base pusher;

FIG. 18 is a perspective view of the load carrier during a second stage of downward pivoting movement of the base pusher;

FIG. 19 is a perspective view of a portion of the load carrier as the handgrip of the U-shaped base pusher approaches the load-support frame of the rolling base;

FIG. 20 is a perspective view of a portion of the load carrier just before an elastic finger included in each of the front-wheel units snaps into engagement with one of the side legs included in the U-shaped base pusher;

FIG. 21 is a view similar to FIG. 20 showing mating engagement of each elastic finger with one of the base pusher side legs to retain the base pusher in the stored position on the load-support frame of the rolling base when the load carrier is placed in the flat-storage mode;

FIG. 22 is a detail perspective view of a portion of the load carrier of FIG. 1B broken away to show that the spreader-driver lock includes a pair of spring-loaded slider-retainer pins coupled to the wheel-support rails of the load-support frame that are spring-biased to hold the slidable spreader driver in place along the load-support frame when the base pusher reaches the upright cart position and a pin release coupled to the FOLD button and mounted for movement relative to the slidable spreader driver to provide means for pushing the slider-retainer pins out of engagement with the slidable spreader driver when the FOLD button is pushed by a user to allow the base pusher to be collapsed from the upright cart position to the stored position;

FIG. 22A is a detailed top plan view of a portion of FIG. 22 showing that the slider-retainer pins are mounted in the wheel-support rails and received in pin-receiver apertures formed in the slidable spreader driver to hold the slidable spreader driver in place in a stationary position relative to the load-support frame;

FIG. 23 is a view similar to FIG. 22 showing a user pressing a FOLD button coupled to the pin release of the spreader-driver lock so that the slidable spreader driver is free to move relative to the load-support frame when the base pusher is collapsed from the upright cart position to the stored position;

FIG. 23A is a detailed top plan view of a portion of FIG. 23 showing that the pin release includes pin pushers that push the slider-retainer pins out of the pin-receiver apertures formed in the slidable spreader driver when the FOLD button is pressed by a user.

DETAILED DESCRIPTION

Figure 1:
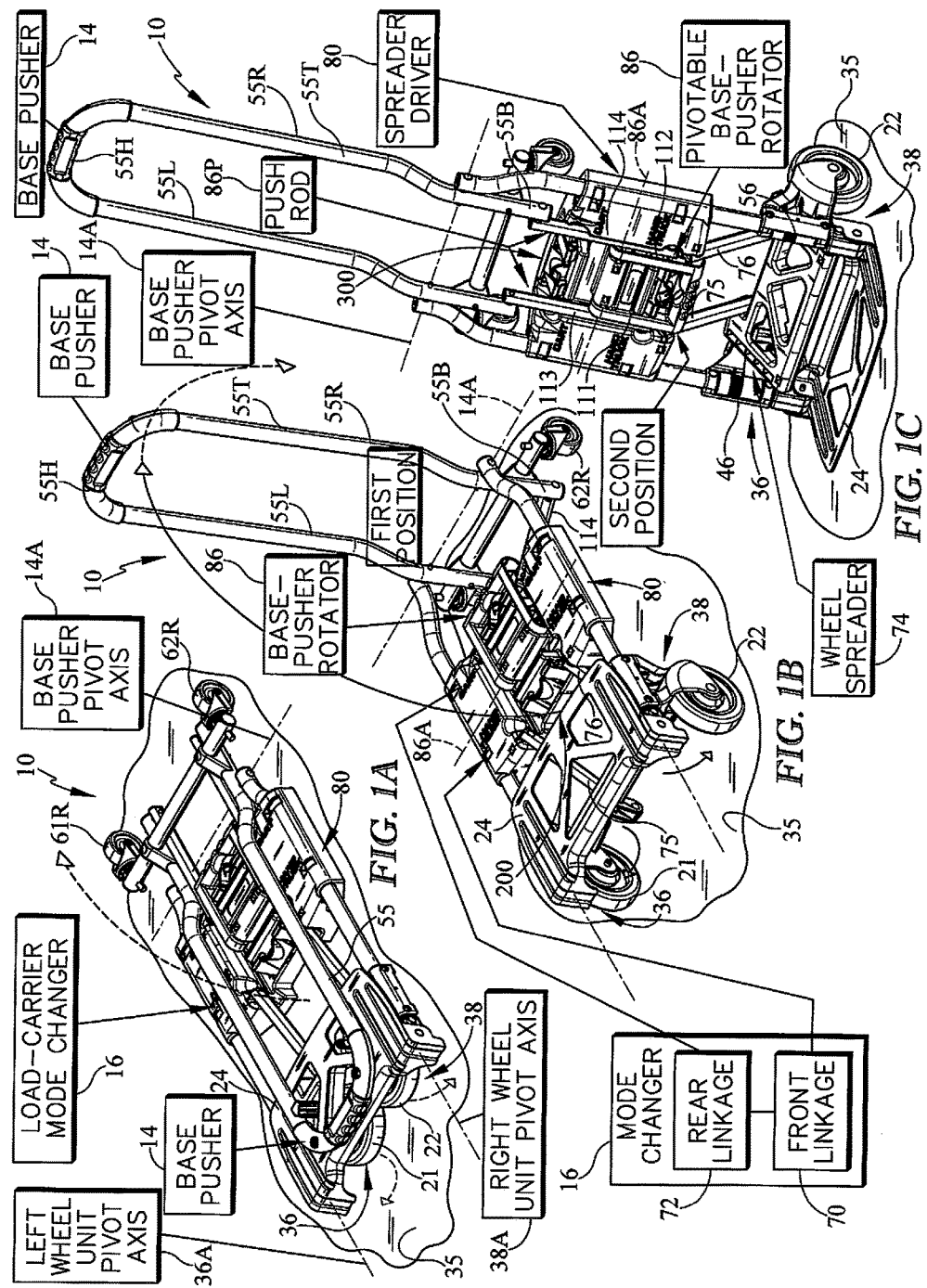
FIG. 1A is a perspective view of a collapsible load carrier in a compact flat storage mode.
FIG. 1B is a perspective view of the load carrier of FIG. 1A after it has been reconfigured in the field by a user to assume a front-and-rear-wheel cart mode in response to upward pivotable movement of a base pusher about a base-pusher pivot axis away from an underlying load-support frame included in a rolling base through an angle of about 90° to assume an upright cart position and to cause forward sliding movement of a load-carrier mode changer away from the upright base pusher on two horizontal rails included in the load-support frame to engage and pivot each of two front wheel units outwardly from the folded storage positions shown in FIG. 1A to the unfolded rolling positions shown in FIG. 1B.
FIG. 1C is a perspective view of the load carrier of FIGS. 1A and 1B after it has been reconfigured in the field to assume a 2-wheel upright hand-truck mode in which the load carrier can roll only on its two front wheels by operating the load-carrier mode changer to cause rearward pivotable movement of the base pusher about the base-pusher pivot axis through another angle of about 90°.

A load carrier 10 in accordance with the present disclosure includes a rolling base 12 including front wheels 21, 22, a base pusher 14 mounted for pivotable movement on rolling base 12 between several orientation positions, and a load-carrier mode changer 16 as shown in FIGS. 1A-1C. Load-carrier mode changer 16 can be operated in the field without tools by a user to convert load carrier 10 from a flat storage mode shown in FIG. 1A first to a front-and-rear-wheel cart mode shown in FIG. 1B and then to a 2-wheel hand-truck mode shown in FIG. 1C.

In illustrative embodiments, a user can use load-carrier mode changer 16 to change the orientation of front wheels 21, 22 and base pusher 14 relative to a load-support frame 18 included in rolling base 12 to convert load carrier 10 to one of three different modes. Load-carrier mode changer 16 includes a front linkage 70 associated with front wheels 21, 22 and a rear linkage 72 associated with base pusher 14 and coupled to the front linkage 70 as suggested in FIGS. 1B and 2. The disclosure in U.S. application Ser. No. 14/330,890, filed Jul. 14, 2014, is in its entirety hereby incorporated by reference herein.

Figure 5:
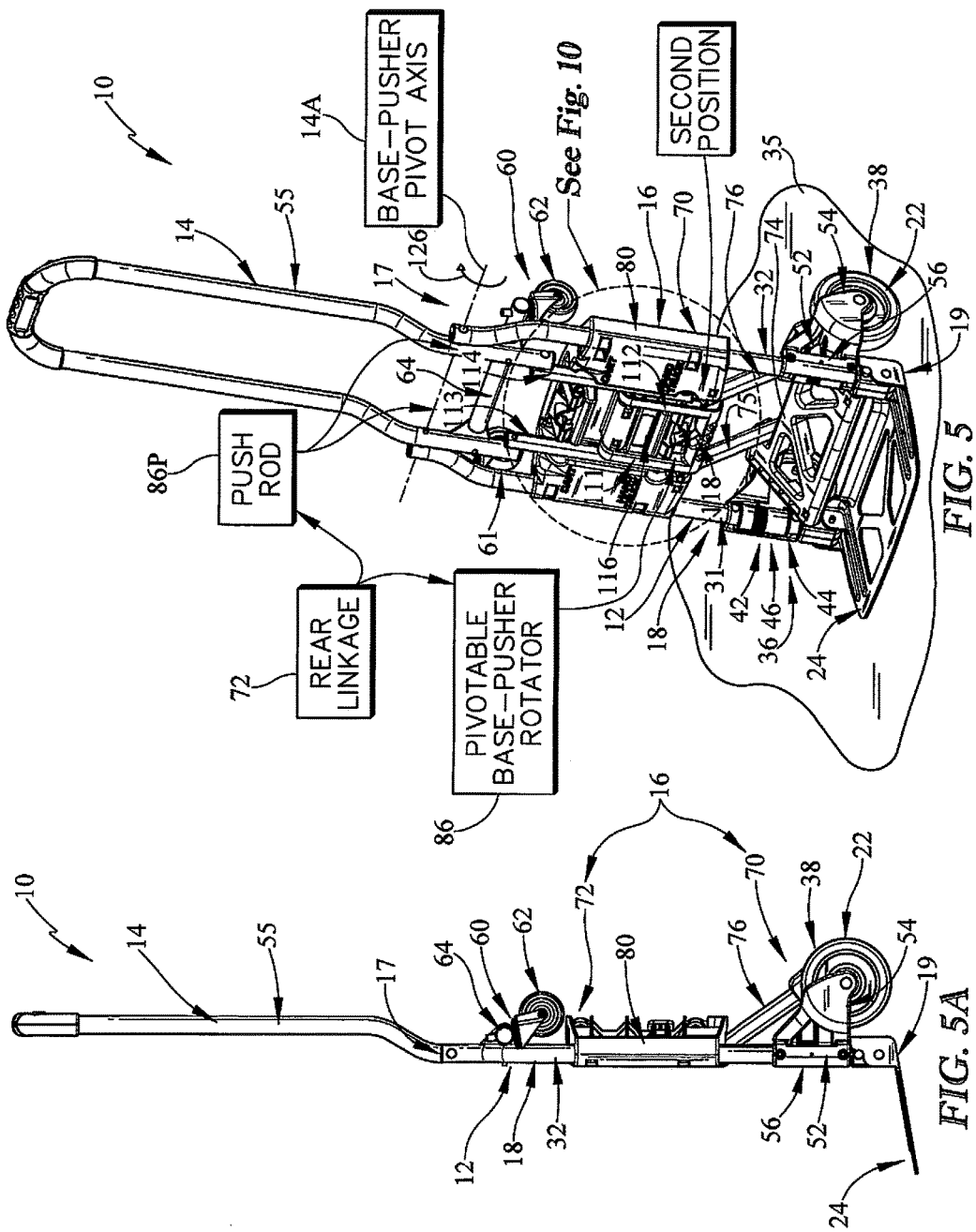
Figure 6:
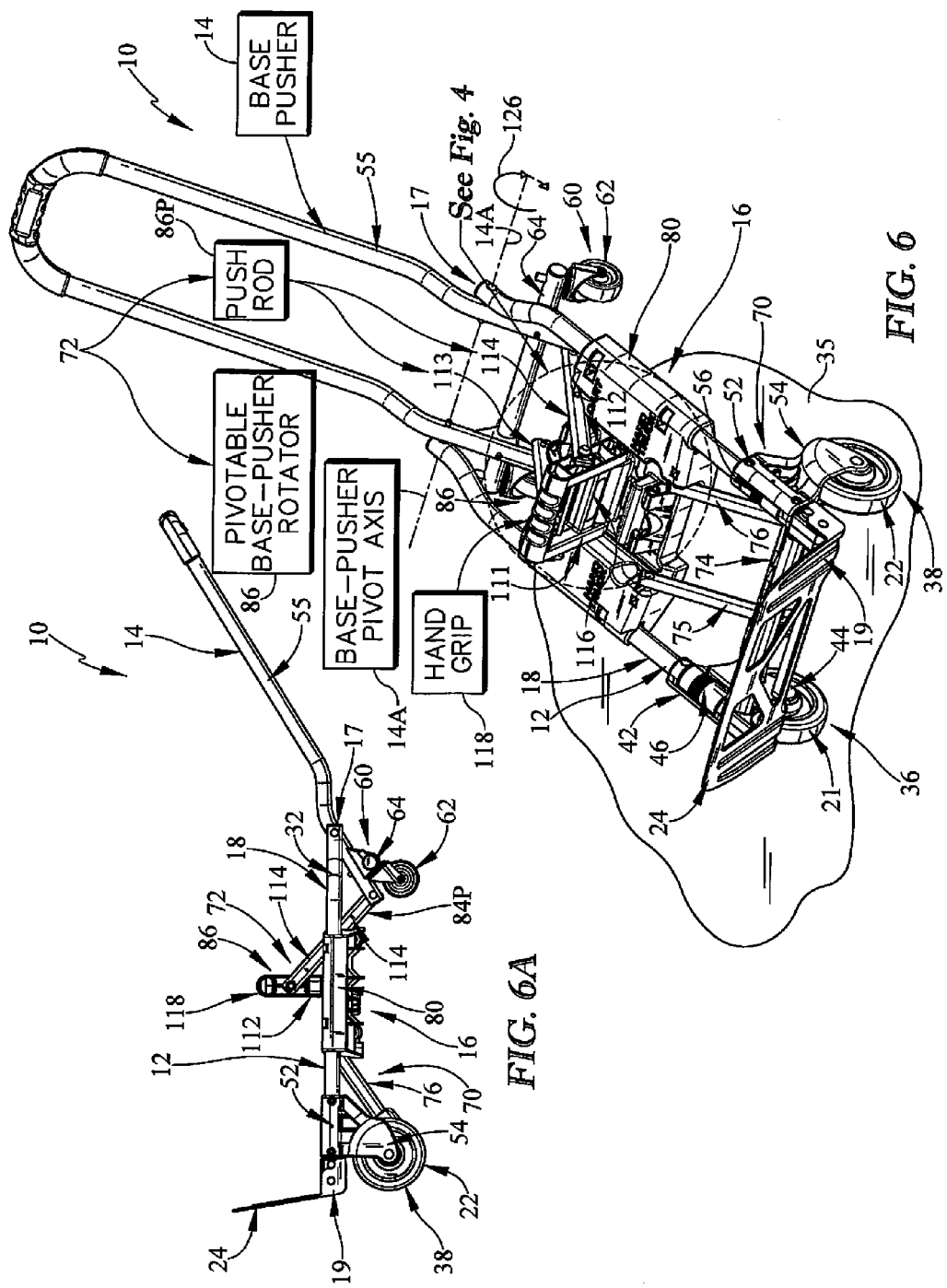

Rear linkage 72 of mode changer 16 is operable by a user to cause base pusher 14 to pivot about a base-pusher pivot axis 14A to move back and forth between (1) an upright cart position shown in FIG. 1B and associated with the foot-and-rear-wheel cart mode of load carrier 10 and (2) a laidback hand-truck position shown in FIG. 1C and associated with the 2-wheel hand-truck mode of load carrier 10. Rear linkage 72 comprises a pivotable base-pusher rotator 86 and a push rod 86P pivotably coupled to base pusher 14 and to base-pusher rotator 86. Push rod 86P is configured to provide means for pivoting base pusher 14 automatically about base-pusher pivot axis 14A relative to load-support frame 18 of rolling base 12 in response to manual pivoting of base-pusher rotator 86 about a pusher-rotator pivot axis 86A as shown in FIGS. 1B and 1C and also shown in FIGS. 5-7.

Front linkage 70 of mode changer 16 cooperates with rear linkage 72 to provide means for causing the spring-loaded left and right front wheel units 36, 38 included in rolling base 12 to pivot relative to wheel-support rails 31, 32 of mobile base 12 from (1) folded storage positions shown in FIG. 1A and associated with the flat storage mode of load carrier 10 to (2) unfolded rolling positions shown in FIG. 1B and associated with the front-and-rear-wheel cart mode and the 2-wheel hand-truck mode of load carrier in response to pivoting movement of base pusher 14 about base-pusher pivot axis 14A from the upright cart position shown in FIG. 1B to a stored position shown in FIG. 1A. Front linkage 70 comprises a rotator-support platform which is, for example, a spreader driver 80 mounted for sliding movement on left and right front-wheel support rails 31, 32 included in a load-support frame 18 of the rolling base 12 and a wheel spreader 74 coupled to the pivotable left and right front wheel units 36, 38 and the slidable spreader driver 80. Pivotable base-pusher rotator 86 is mounted for pivotable movement on rotation-support platform 80. Wheel spreader 74 is configured to provide means for pivoting the front-wheel units 36, 38 from the folded storage positions shown in FIG. 1A to the unfolded rolling positions shown in FIG. 1B in response to sliding movement of the spreader driver 80 on the front-wheel support rails 31, 32 in a direction toward front-wheel units 36, 38 caused by pivoting movement of base pusher 14 about base-pusher pivot axis 14A from the stored position shown in FIG. 1A to the upright cart position shown in FIG. 18.

Figure 2:
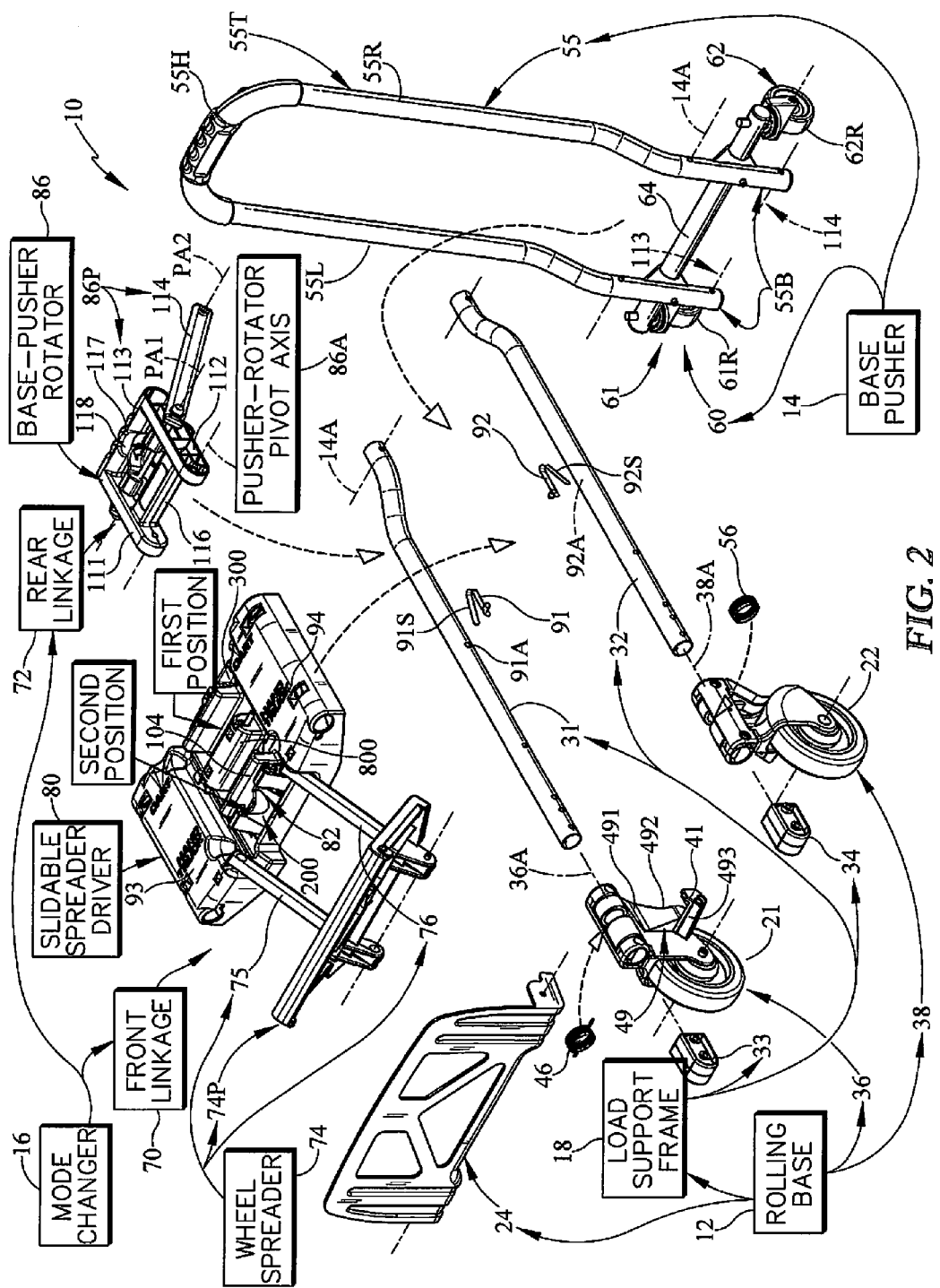
FIG. 2 is a perspective view of various components and subassemblies that cooperate to form the collapsible load carrier of FIGS. 1A-1C and showing that the load-carrier mode changer includes a front linkage including a wheel spreader and a slidable spreader driver and a rear linkage including a push rod adapted to be pivotably coupled to the base pusher and a base-pusher rotator that is coupled for pivotable movement to an inner end of the push rod and configured to be mounted on the slidable spreader driver for pivotable movement about a pusher-rotator pivot axis between a FIRST POSITION associated with the front-and-rear-wheel cart mode and shown in FIG. 1B and a SECOND POSITION associated with the 2-wheel upright hand-truck mode and shown in FIG. 1C to cause the base pusher to rotate about the base-pusher pivot axis from the upright cart position shown in FIG. 1B to the laidback hand-truck position shown in FIG. 1C in response to manual pivoting movement of the base-pusher rotator from the SECOND POSITION to the FIRST POSITION.

Base-pusher rotator 86 of rear linkage 72 is mounted on the slidable spreader driver 80 of front linkage 70 for pivotable movement about a pusher-rotator pivot axis 86A as suggested in FIG. 2 and in FIGS. 10-15. Base-pusher rotator 86 therefore moves back and forth relative to load-support frame 18 of rolling base 12 as spreader driver 80 slides on front-wheel support rails 31, 32 of load-support frame 18 as suggested, for example, in FIGS. 1A-1C.

Front linkage 70 of mode changer 16 also includes a forward hand-truck lock 200 mounted on a left-side forward portion of the slidable spreader driver (rotator-support platform) 80 and an aft cart lock 300 mounted on a right-side aft portion of the slidable spreader driver 80 as shown, for example, in FIG. 4 and FIGS. 10-16. Hand-truck lock 200 is mounted for pivotable movement about a forward lock pivot axis 200A relative to spreader driver 80 to engage and retain the pivotable base-pusher rotator 86 in the SECOND POSITION on spreader driver 80 as suggested in FIGS. 1C and 10 so that base pusher 14 is retained in the laidback hand-truck position. Cart lock 300 is mounted for pivotable movement about an aft lock pivot axis 300A relative to spreader driver 80 (and independent of hand-truck lock 200) to engage and retain the pivotable base-pusher rotator 86 in the FIRST POSITION on spreader drive 80 as suggested in FIGS. 1B and 15.

An anchor rod 118 is included in base-pusher rotator 86 and arranged to be engaged by hand-truck lock 200 to retain base-pusher rotator 86 in the SECOND POSITION as shown, for example, in FIG. 10. Anchor rod 118 is also arranged to be engaged by cart lock 300 to retain base-pusher rotator 86 in the FIRST POSITION as shown, for example, in FIG. 15. In illustrative embodiments, as suggested in FIGS. 2 and 10, base-pusher rotator 86 also includes a first pivot link 111 mounted for pivotable movement about pusher-rotator pivot axis 86A, a second pivot link 112 mounted for pivotable movement about pusher-rotator pivot axis 86, a handgrip 117 coupled to free ends of pivot links 111, 112 to retain those links 11, 112 in spaced-apart parallel relation to one another, and a crossbar (strut) 116 arranged to interconnect pivot links 111, 112 and lie between pusher-rotator pivot axis 86A and handgrip 117. Anchor rod 118 is also arranged to interconnect pivot links 111, 112 and to lie between crossbar 116 and handgrip 117.

Base pusher 14 includes a U-shaped top portion 55T having a handgrip 55H and extending upwardly above base-pusher pivot axis 14A and a bottom portion 55B extending downwardly below base-pusher pivot axis 14A as shown, for example, in FIG. 2. Load-carrier mode changer 16 is coupled at a rear end to bottom portion 55B of base pusher 14 and at a front end to the pivotable left and right front wheel units 36, 38. If the bottom portion 55B of base pusher 14 is pushed away from front wheel units 36, 38, then the U-shaped top portion 55T of base pusher 14 will pivot forwardly and downwardly toward load-support frame 18 of rolling base 12. Alternatively, if the bottom portion 55B of base pusher 14 is pulled toward front wheel units 36, 38, the U-shaped top portion 55T of base pusher 14 will pivot rearwardly and upwardly away from load-support frame 18 of rolling base 12.

Two pusher links 113, 114 are included in push rod 86P of rear linkage 72 in illustrative embodiments of the present disclosure as suggested in FIGS. 1C, 2, and 10-15. Each of the pusher links 113, 114 included in push rod 86P has an outer end that is pivotably coupled to bottom portion 55B of base pusher 14 at a first pivot axis PA1 and an inner end that is pivotably coupled to a middle portion of base-pusher rotor 86 at a second pivot axis PA2. In use, pusher links 113, 114 of push rod 86P pivot about second pivot axis PA2 relative to base-pusher rotator 86 during pivotable movement of base-pusher rotator 86 about pusher-rotator pivot axis 86A between the FIRST POSITION and the SECOND POSITION as suggested in FIGS. 5-10.

Figure 4:
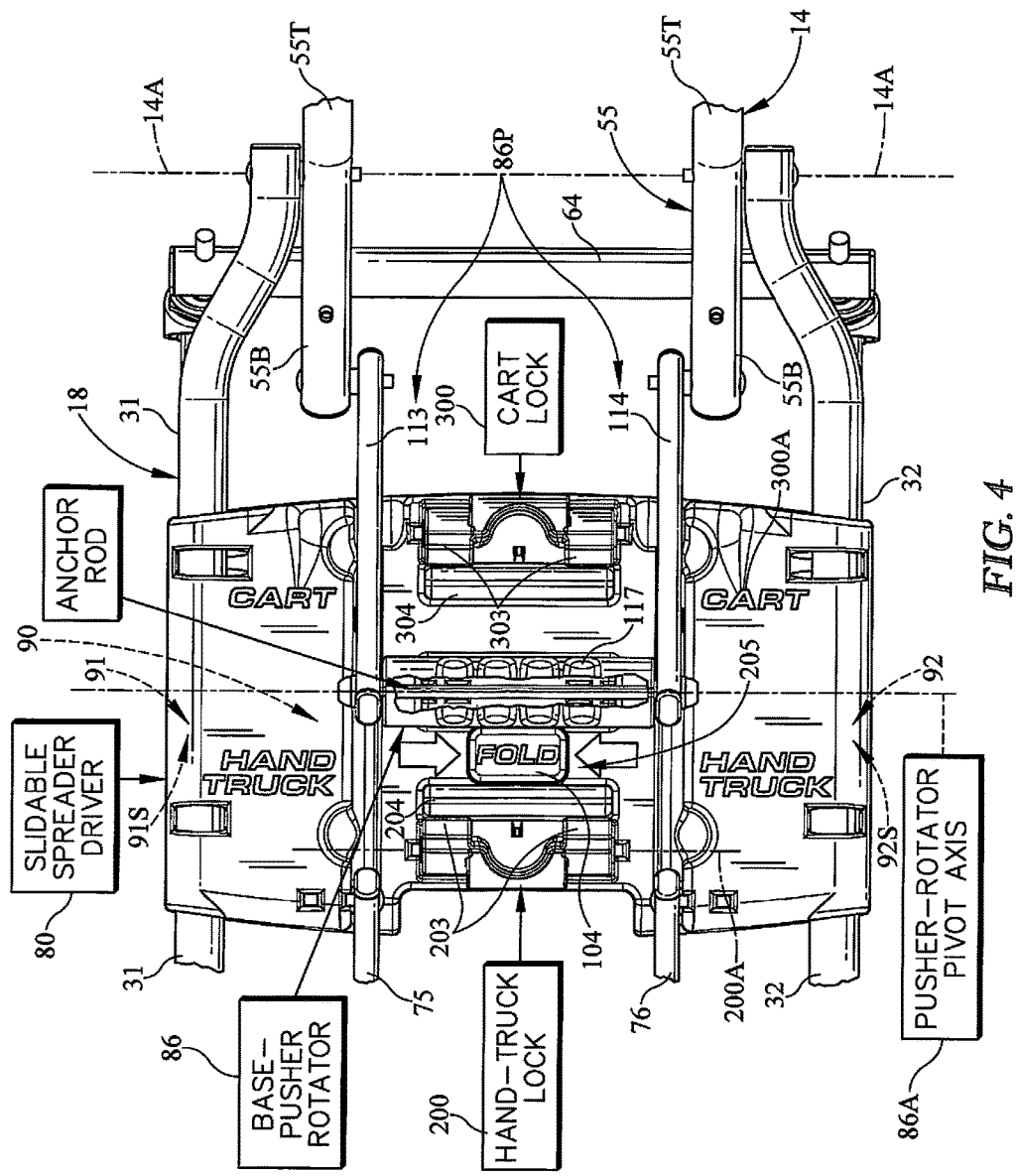
FIG. 4 is an enlarged top plan view of a portion of the load carrier of FIGS. 1A-1C when the load-carrier mode changer in a neutral position showing the pivotable base-pusher rotator in an upright position (See also FIG. 12), with a portion of a hand grip included in the pivotable base-pusher rotator broken away to show a narrow-diameter anchor rod also included in the pivotable base-pusher rotator, and showing that the load-carrier mode changer also includes a (1) spreader driver mounted for sliding movement on two wheel-support rails included in the load-support frame of the rolling base and configured to support the base-pusher rotator for pivotable movement about a pusher-rotator pivot axis between the FIRST POSITION and the SECOND POSITION, (2) a pivotable, spring-loaded, anchor-rod (hand-truck) lock coupled to the left side of the spreader driver for mating with the narrow-diameter anchor rod to retain the pusher rotator in the SECOND POSITION on the spreader driver to establish the 2-wheel hand-truck mode of the load carrier, (3) a pivotable, spring-loaded, anchor-rod (cart) lock coupled to the right side of the spreader driver for mating with the narrow-diameter anchor rod of the base-pusher rotator to retain the base-pusher rotator in the FIRST POSITION on the spreader driver to establish the front-and-rear-wheel cart mode of the load carrier, and (4) a FOLD button located between the anchor-rod (hand-truck) lock on the left side of the spreader driver and a central pusher-rotator mount provided in the center of the spreader driver and configured to disable a spreader-driver lock (when pressed by a user) to free the spreader driver to slide on the two horizontal wheel-support rails of the load-support frame of the rolling base during folding movement of the base pusher downwardly toward the load-support frame to its stored position.

A forward hand-truck lock 200 is coupled to the rotator-support platform 80 as suggested in FIG. 4 and configured to engage the pivotable base-pusher rotator 86 when the pivotable base-pusher rotator 86 is moved to assume the FIRST POSITION to retain the pivotable base-pusher rotator 86 in the FIRST POSITION so as to retain the base pusher 14 in the upright cart position. The forward hand-truck lock 200 is mounted on a forward portion of the rotator-support platform 80 to lie between the left and right front wheel units 21, 22 and the pusher-rotator pivot axis 86A and to pivot about a forward lock pivot axis 200A relative to the rotator-support platform 80 to engage and retain the pivotable base-pusher rotator 86 in the SECOND POSITION on the rotator-support platform 80 as suggested in FIG. 10.

An aft cart lock 300 is coupled to the rotator-support platform 80 to lie in spaced-apart relation to the forward hand truck lock 200 as suggested in FIG. 4. Aft cart lock 300 is configured to engage the pivotable base-pusher rotator 86 when the pivotable base-pusher rotator 86 is moved to assume the SECOND POSITION to retain the pivotable base-pusher rotator 86 in the SECOND POSITION so as to retain the base pusher 14 in the two-wheel laidback hand-truck position. The aft cart lock 300 is mounted on a rearward portion of the rotator-support platform 80 to lie between the pusher-rotator pivot axis 86A and the base-pusher pivot axis 14A and to pivot about an aft lock pivot axis 300A relative to the rotator-support platform 80 to engage and retain the pivotable base-pusher rotator 86 in the FIRST POSITION on the rotator-support platform 80 as suggested in FIG. 15.

Base pusher 14 includes a top portion 55T having a handgrip 55H and extending upwardly above the base-pusher pivot axis 14A and a bottom portion 55B extending downwardly below the base-pusher pivot axis 14A as suggested in FIG. 1C. Load-support frame 18 is pivotably coupled to the top portion 55T of the base pusher 14. Push rod 86P is pivotably coupled to the bottom portion 55B of the base pusher 14.

The pivotable base-pusher rotator 86 includes a horizontally extending anchor rod 118 that is arranged to lie in spaced-apart relation to the pusher-rotator pivot axis 86A as suggested in FIGS. 4 and 10. The pivotable base-pusher rotator 86 is arranged to be engaged by the forward hand-truck lock 200 to retain the pivotable base-pusher rotator 86 in the SECOND POSITION and is also arranged to be engaged by the aft cart lock 300 to retain the pivotable base-pusher rotator 86 in the FIRST POSITION.

Aft cart lock 300 includes a pivotable rod retainer 301 (see FIG. 3) mounted for pivotable movement on the rearward portion of the rotator-support platform 80 between a locked position wherein the anchor rod 118 is trapped between the pivotable rod retainer 301 and the rearward portion of the rotator-support platform 80 to retain the pivotable base-pusher rotator 86 in the FIRST POSITION and an unlocked position wherein the anchor rod 118 is released to allow pivoting movement of the pivotable base-pusher rotator 86 from the FIRST POSITION to the SECOND POSITION. Aft cart lock 300 also includes a spring 302 coupled to the rotator-support platform 80 and arranged to yieldably urge the pivotable rod retainer 301 normally to the locked position and a cam ramp 303 coupled to the pivotable rod retainer 301 and arranged to intercept the anchor rod 118 during pivoting movement of the pivotable base-pusher rotator 86 from the SECOND POSITION to the FIRST POSITION. Cam ramp 303 is configured to provide means for pivoting the pivotable rod retainer 301 against the spring 302 from the locked position to the unlocked position due to camming engagement of the anchor rod 118 on the cam ramp 303 during pivotable movement of the pivotable base-pusher rotator 86 from the SECOND POSITION to the FIRST POSITION so that the anchor rod 118 can be moved to assume a trapped position between the pivotable rod retainer 301 and the rearward portion of the rotator-support platform 80 to retain the pivotable base-pusher rotator 86 in the FIRST POSITION.

Figure 3:
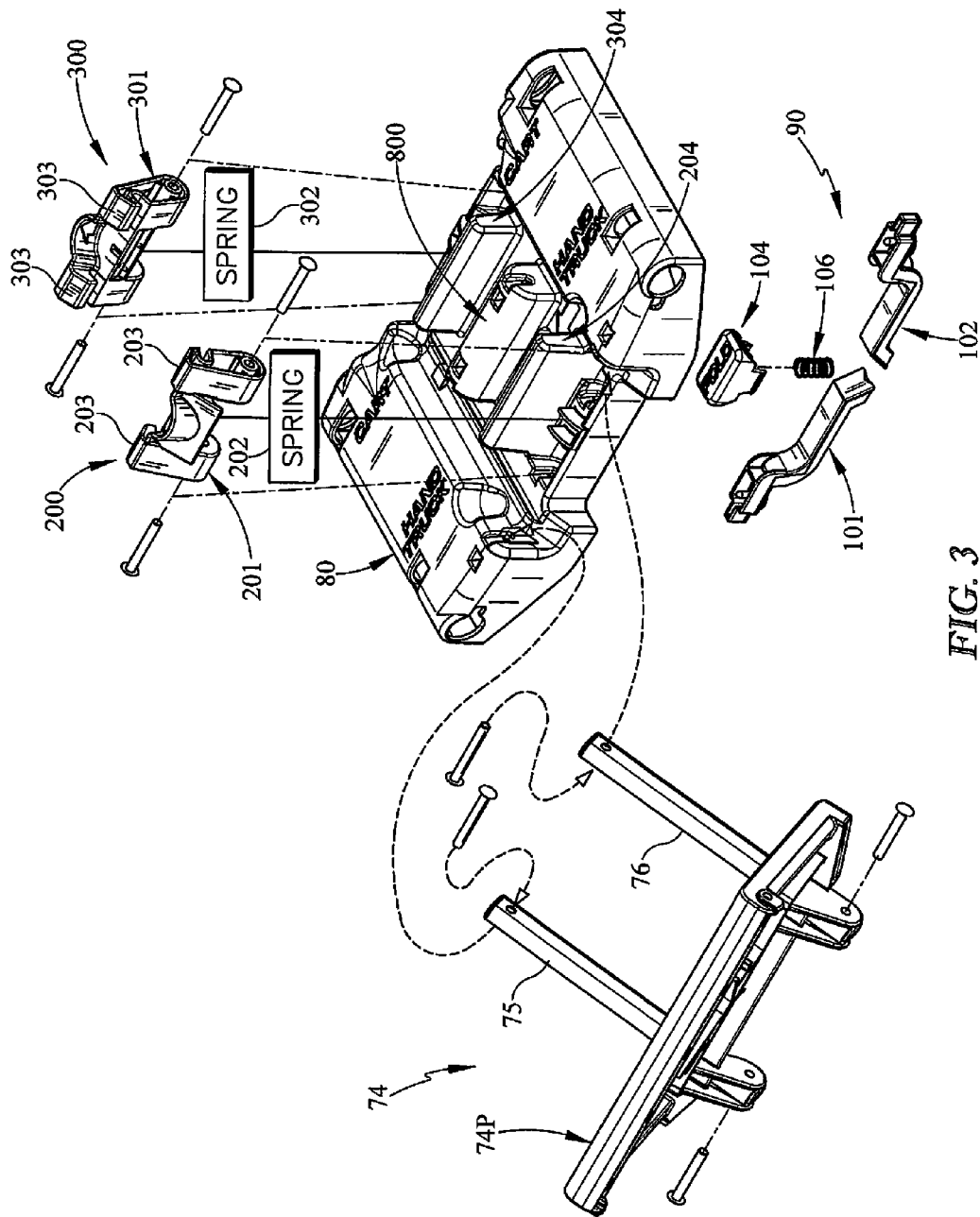
FIG. 3 is an exploded perspective assembly of components comprising the front linkage of the load-carrier mode changer shown in FIG. 2.

Aft cart lock 300 further includes a rearward-portion retainer stop 304 coupled to the rearward portion of the rotator-support platform 80 as suggested in FIG. 3. Rearward-portion retainer stop 304 is arranged to extend upwardly away from the load-support frame 18 to provide means for limiting pivotable movement of the pivotable rod retainer 301 toward the forward hand-truck lock 200 in response to exposure of the pivotable rod retainer 301 to movement-inducing torque generated by the spring 302 to establish the locked position of the pivotable rod retainer 301.

Forward hand-truck lock 200 includes a pivotable rod retainer 201 (see FIG. 3) mounted for pivotable movement on the forward portion of the rotator-support platform 80 between a locked position wherein the anchor rod 118 is trapped between the pivotable rod retainer 201 and the forward portion of the rotator-support platform 80 to retain the pivotable base-pusher rotator 86 in the SECOND POSITION and an unlocked position wherein the anchor rod 118 is released to allow pivoting movement of the pivotable base-pusher rotator 86 from the SECOND POSITION to the FIRST POSITION. Forward hand-truck lock 200 further includes a spring 202 coupled to the rotator-support platform 80 and arranged to yieldably urge the pivotable rod retainer 201 normally to the locked position and a cam ramp 203 coupled to the pivotable rod retainer 201 and arranged to intercept the anchor rod 118 during pivoting movement of the pivotable base-pusher rotator 86 from the FIRST POSITION to the SECOND POSITION. Cam ramp 203 is configured to provide means for pivoting the pivotable rod retainer 118 against the spring 202 from the locked position to the unlocked position due to camming engagement of the anchor rod 118 on the cam ramp 203 during pivotable movement of the pivotable base-pusher rotator 86 from the FIRST POSITION to the SECOND POSITION so that the anchor rod 118 can be moved to assume a trapped position between the pivotable rod retainer 201 and the forward portion of the rotator-support platform 80 to retain the pivotable base-pusher rotator 86 in the SECOND POSITION.

Forward hand-truck lock 200 further includes a forward-portion retainer stop 204 coupled to the forward portion of the rotator-support platform 80 as suggested in FIG. 3. Forward-portion retainer stop 204 is arranged to extend upwardly away from the load-support frame 18 to provide means for limiting pivotable movement of the pivotable rod retainer 118 toward the aft cart lock 300 in response to exposure of the pivotable rod retainer 201 to movement-inducing torque generated by the spring 202 to establish the locked position of the pivotable rod retainer 201.

The pivotable base-pusher rotator 86 also includes first and second pivot links 111, 112 arranged to lie in spaced-apart relation to one another and mounted for pivotable movement about the pusher-rotator pivot axis 86A and a rotator handgrip 117 coupled to free ends of the first and second pivot links 111, 112 as suggested in FIG. 10. Anchor rod 118 is arranged to interconnect the first and second pivot links 111, 112 and to lie between the pusher-rotator pivot axis 86A and the rotator handgrip 117. The pivotable base-pusher rotator 86 also includes a crossbar 116 arranged to interconnect the first and second pivot links 111, 112 and lie between the pusher-rotator pivot axis 86A and the anchor rod 118 and to lie in and fill a space 205 (see FIG. 3) provided between the forward-portion stop 204 and the pusher-rotator pivot axis 86A to provide means for blocking access (see FIG. 10) to a fold button 104 that is mounted for movement in the forward portion of the rotator-support platform 80 and operable to initiation collapse of the load carrier 10 to regulate movement of the base pusher 14 from the front-and-rear-wheel cart position to the stored position.

In use, during opening of load carrier 10 (see, for example, FIGS. 1A-1C), pivoting movement of base-pusher rotator 86 about pusher-rotator pivot axis 86A relative to spreader driver 80 from the FIRST POSITION to the SECOND POSITION causes each pusher link 113, 114 of push rod 86P to pivot about second pivot axis PA2 relative to base-pusher rotator 86 and causes base pusher 14 to pivot relative to pusher links 113, 114 about first pivot axis PA1 so that base pusher 14 is pivoted to move from the upright cart position shown in FIG. 1B and associated with the front-and-rear-wheel cart mode of load carrier 10 to the laidback hand-truck position shown in FIG. 1C and associated with the 2-wheel hand-truck mode of load carrier 10. In use, during closing of load carrier 10 (see, for example, FIGS. 10-15), pivoting movement of base-pusher rotator 86 about pusher-rotator axis 86A relative to spreader driver 80 from the SECOND POSITION to the FIRST POSITION causes each pusher link 113, 114 of push rod 86P to pivot about second pivot axis PA2 relative to base-pusher rotator 86 and causes base pusher 14 to pivot relative to pusher links 113, 114 about second pivot axis PA2 so that base pusher 14 is pivoted to move from the laidback hand-truck position shown in FIG. 1C and associated with the 2-wheel hand-truck mode of load carrier 10 to the upright cart position shown in FIG. 1B and associated with the front-and-rear-wheel cart mode of load carrier 10.

In illustrative embodiments, rolling base 12 comprises a load-support frame 18 including left and right wheel-support rails 31, 32. Base pusher 14 is mounted on the wheel-support rails 31, 32 for pivotable movement relative to load-support frame 18 about a base-pusher pivot axis 14A. Rolling base 12 also includes a left front wheel unit 36 mounted on left wheel-support rail 31 for pivotable movement between a folded storage position and an unfolded rolling position and a right front wheel unit 38 mounted on right wheel-support rail 32 for pivotable movement between a folded storage position and an unfolded rolling position. Mode changer 16 is coupled at a rear end to the pivotable base pusher 14 and at a front end to the pivotable left and right front wheel units 36, 38.

Load-carrier mode changer 16 is coupled to rolling base 12 and to base pusher 14 and configured to provide means for converting load carrier 10 either to a flat storage mode shown in FIG. 1A, a front-and-rear-wheel cart mode shown in FIG. 1B, or a 2-wheel hand-truck mode shown in FIG. 1C at the option of a user without tools. Mode changer 16 includes a front linkage 70 coupled to front wheel units 36, 38 and arranged to slide on the wheel-support rails 31, 32 of load-support frame 18. Mode changer 16 also includes a rear linkage 72 coupled to the pivotable base pusher 14 and to the front linkage 70 in either a FIRST POSITION or a SECOND POSITION selected by the user. It is within the scope of the present disclosure to use a single rear wheel so that three wheels engage and roll on ground underlying the rolling base in an alternative front-and-rear-wheel cart mode of the load carrier.

In illustrative embodiments, rolling base 12 includes two front wheels 21, 22 and the base pusher includes two rear wheels 61, 62. All four wheels are disengaged from ground underlying rolling base 12 when load carrier 10 is in the flat storage mode as suggested in FIG. 1A. All four wheels are arranged to engage and roll on ground underlying rolling base 12 when load carrier 10 is configured in the field by a user to assume a front-and-rear wheel cart mode as suggested in FIG. 1B. In contrast, only the two front wheels 21, 22 are arranged to engage and roll on the ground underlying rolling base 12 when load carrier 10 is configured in the field by the user to assume a 2-wheel hand-truck mode as suggested in FIG. 1C.

In illustrative embodiments, base pusher 14 can be pivoted by a user about base-pusher pivot axis 14A through a 180° angle to move relative to rolling base 12 from a stored position on top of load-support frame 18 of rolling base 12 to change load carrier 10 from a flat storage mode to a 2-wheel hand-truck mode as suggested in FIGS. 1A and 1B. First base pusher 14 is pivoted in a rearward first direction through about a 90° angle to assume an upright cart position to place the rear wheel(s) on the ground while rear linkage 72 is in the FIRST POSITION on the front linkage 70 to cause the front and rear linkages 70, 72 to move together as a unit to pivot the left and right front wheel units 36, 38 to the unfolded rolling positions and to place the front wheels 21, 22 on the ground along with the rear wheel(s) to establish the front-and-rear-wheel cart mode of load carrier 10. Then base pusher 14 is pivoted in the same direction through another 90° angle to disengage the rear wheel(s) from the ground during movement of the rear linkage 72 to the SECOND POSITION on the front linkage 70 to place base pusher 14 in line with the top of load-support frame 18 of rolling base 12 to assume a laidback hand-truck position to establish the 2-wheel hand-truck mode of load carrier 10. Thus, load carrier 10 can be converted in the field by a user without tools using the load-carrier mode changer 16 to assume either a flat storage mode, a front-and-rear-wheel cart mode, or a 2-wheel hand-truck mode.

A folding sequence is provided in FIGS. 5-9 to show pivoting movement of the base pusher 14 and of the left and right front wheel units 36, 38 as the load carrier 10 is changed from the 2-wheel hand-truck mode first to the front-and-rear wheel cart mode and then to the flat storage mode. In a perspective view of the load carrier in the 2-wheel hand-truck mode provided in FIG. 5, the pivotable base-pusher rotator 86 is mated with the left-side anchor-rod (hand-truck) lock 200 to retain base-pusher rotator 86 in the SECOND POSITION on spreader driver 80 to establish the 2-wheel hand-truck mode of load carrier 10. Load carrier 10 is shown in a transition mode in FIG. 6 after a user has manually operated the left-side anchor-rod (hand-truck) lock 200 to free base-pusher rotator 86 to pivot about pusher-rotator pivot axis 86A to show rearward pivoting movement of base-pusher rotator 86 about pusher-rotator pivot axis 86A to cause forward pivoting movement of base pusher 14 about base-pusher pivot axis 14A toward base-pusher rotator 86.

Figure 7:
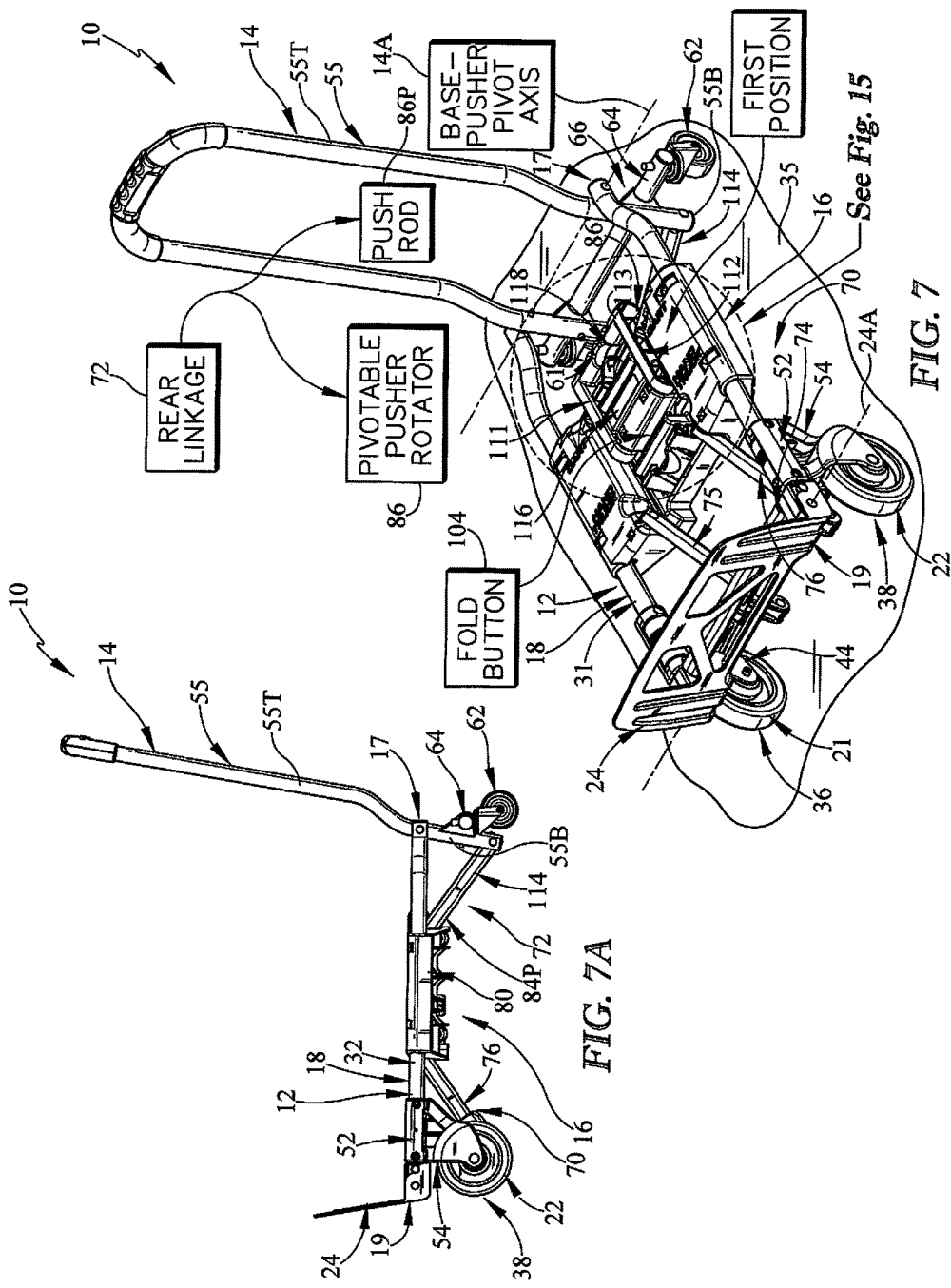

A perspective view of load carrier 10 in the front-and-rear-wheel cart mode is provided in FIG. 7. The pivotable base-pusher rotator 86 is mated with the right-side anchor-rod (cart) lock 200 to retain base-pusher rotator 86 in the FIRST POSITION on spreader driver 80 to establish the front-and-rear-wheel cart mode of load carrier 10 and to expose FOLD button 104 located next to a central pusher-rotator mount 800 included in spreader driver 80 so that a user can push downwardly on the exposed FOLD button 104 to unlock a spreader-driver lock 90 associated with the spreader driver 80 so that the spreader driver 80 is free to slide on the horizontal legs 31, 32 included in the load-support frame 18 of the rolling base 12 during a folding sequence shown in FIGS. 5-9.

Figures 8, 8A:
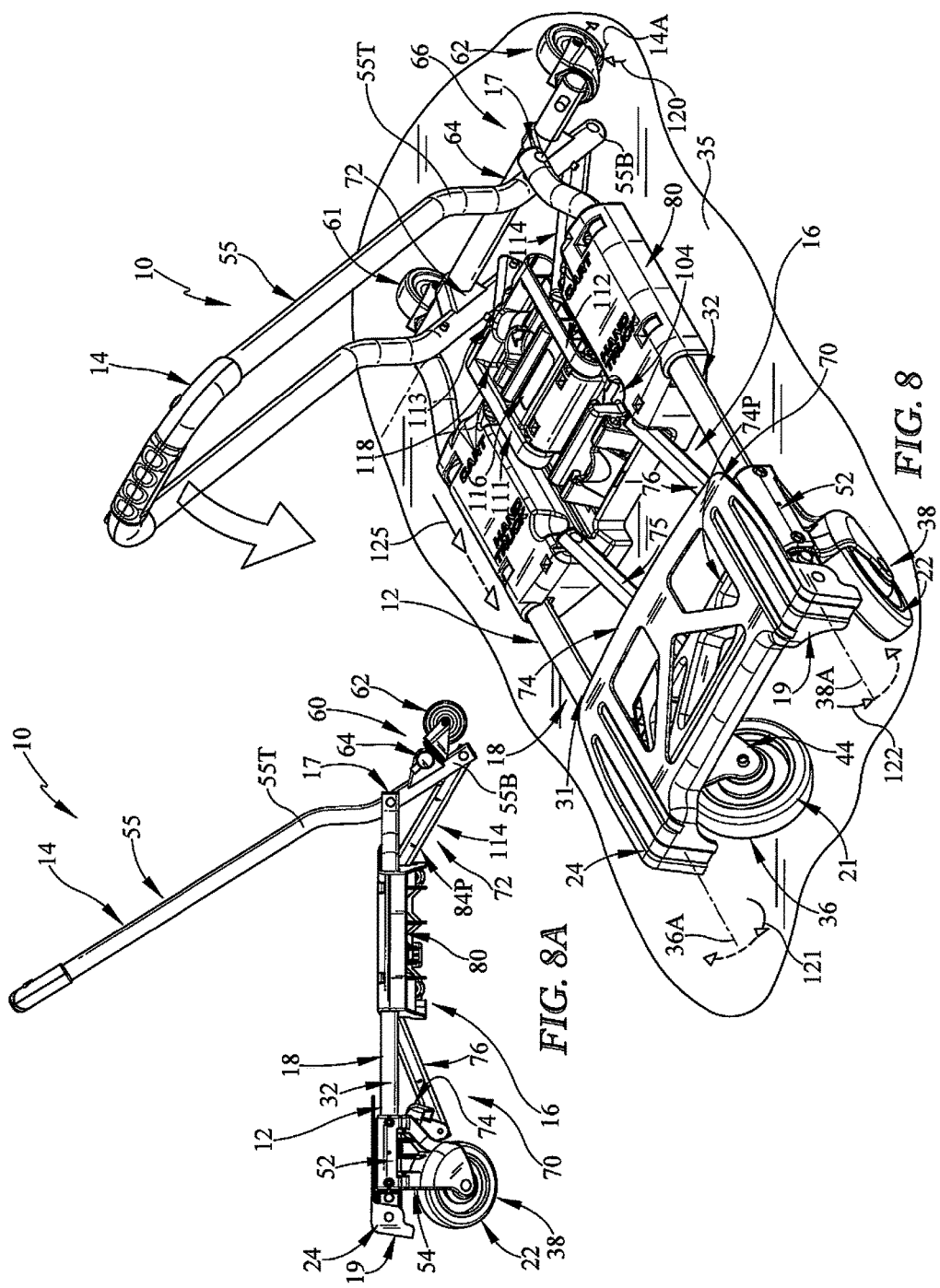

Downward pivoting movement of base pusher 14 about base-pusher pivot axis 14 from the upright cart position toward a position on the underlying load-support frame 18 of rolling base 12 is shown in FIGS. 7-9. Pivoting movement of each of the left and right front wheel units 36, 38 is also shown in FIGS. 7-9.

Load carrier 10 is shown in FIG. 9 in the flat storage mode. Base pusher 14 occupies a stored position on top of load-support frame 18 of rolling base 12. Left and right front wheel units 36, 38 are in their folded storage positions under a U-shaped handgrip 55H included in base pusher 14. An elastic finger 41 included in the left wheel unit 36 engages a left leg 55L of base pusher 14 while an elastic finger 51 included in the right wheel unit 38 engages a right leg 55R of base pusher 14 to retain base pusher 14 in the stored position as shown in FIGS. 9 and 21.

The pivotable base-pusher rotator 86 is locked in the SECOND POSITION on spreader driver 80 due to mating of the left-side anchor-rod (hand truck) lock 200 with the anchor rod 118 in the base-pusher rotator 80 when load carrier 10 is in 2-wheel hand-truck mode. To release the hand-truck lock 200, a user pivots the spring-loaded left-side anchor-rod lock 200 in a counterclockwise direction about a left-side lock pivot axis 200A to release anchor rod 118 of base-pusher rotator 86 to free base-pusher rotator 86 for clockwise pivoting movement about pusher-rotator pivot axis 86A as suggested in FIG. 11. Pivoting movement of base-pusher rotator 86 away from the SECOND POSITION toward the FIRST POSITION exposes the FOLD button 104 that had been hidden behind a lateral crossbar (strut) 116 included in the base-pusher rotator 86 when the base-pusher rotator 86 was located in the SECOND POSITION is shown in FIG. 12.

Figures 12, 13:
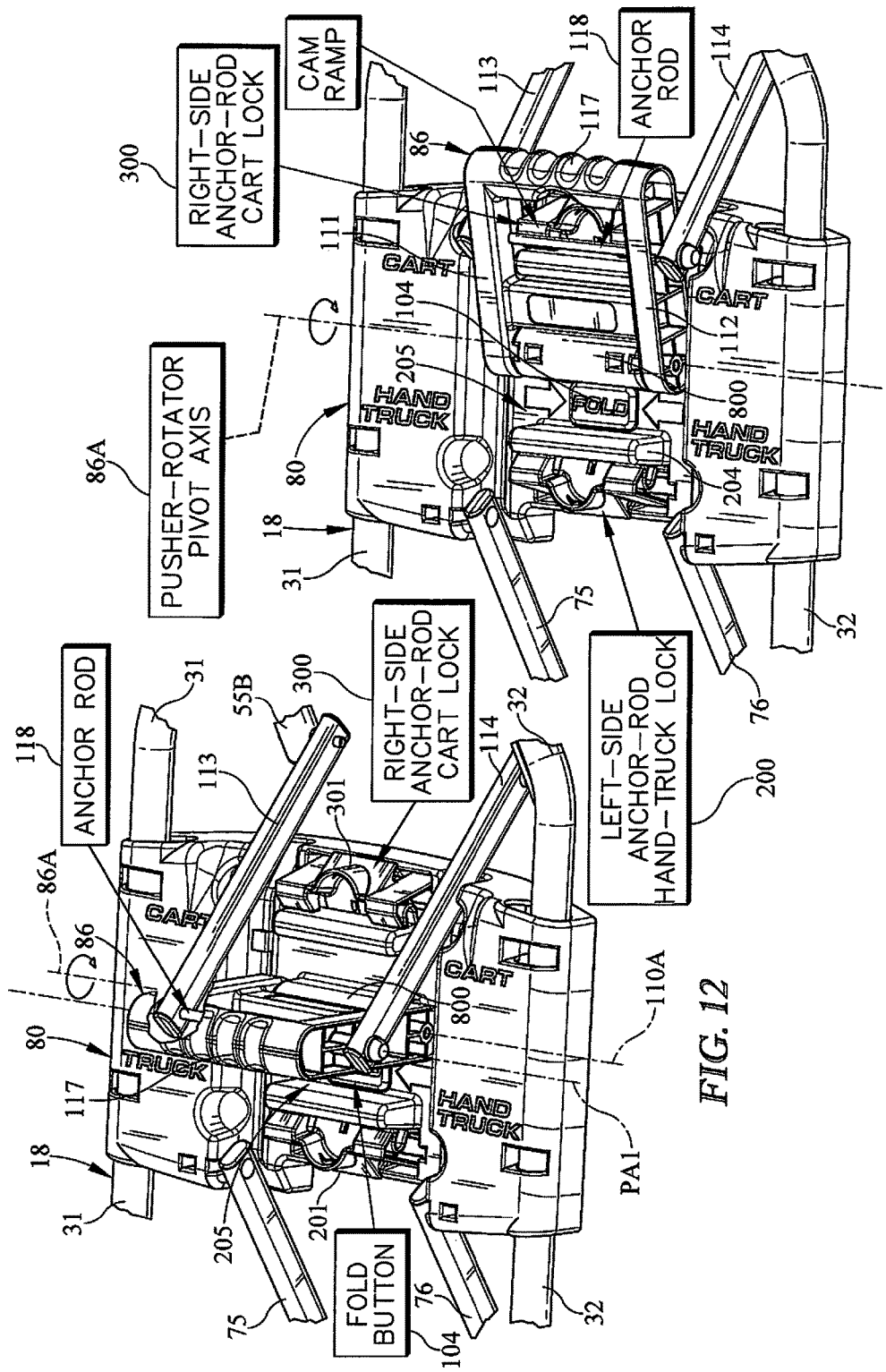
FIG. 12 is a view of the load-carrier mode changer similar to FIGS. 10 and 11 showing pivoting movement of the base-pusher rotator away from the SECOND POSITION toward the FIRST POSITION to expose the FOLD button that had been hidden behind a lateral crossbar (strut) included in the base-pusher rotator when the base-pusher rotator was located in the SECOND POSITION as shown in FIGS. 10 and 11.
FIG. 13 is a view of the load-carrier mode changer similar to FIGS. 10-12 as the pivoting base-pusher rotator is approaching the FIRST POSITION and showing the exposed FOLD button and engagement of the anchor rod of the base-pusher rotator with an upwardly facing cam ramp included in the spring-loaded right-side anchor-rod lock.

Base-pusher rotator 86 has been pivoted to approach the FIRST POSITION as shown in FIG. 13. FOLD button 104 has been exposed and the anchor rod 118 of base-pusher rotator 86 has engaged with an upwardly facing cam ramp included in the spring-loaded right-side anchor-rod (cart) lock 300 as also shown in FIG. 13. The spring-loaded right-side anchor-rod (cart) lock 300 has been pivoted away from the central rotator mount 800 due to camming engagement of the moving anchor rod 118 on the cam ramp of the right-side anchor-rod (cart) lock 300 as shown in FIG. 14. As suggested in FIG. 15, base-pusher rotator 86 has been locked in the FIRST POSITION on spreader driver 80 due to mating of the right-side anchor-rod (cart) lock 300 with anchor rod 118 in base-pusher rotator 86 when load carrier 10 is in the front-and-rear-wheel hand-truck mode.

Figure 16:
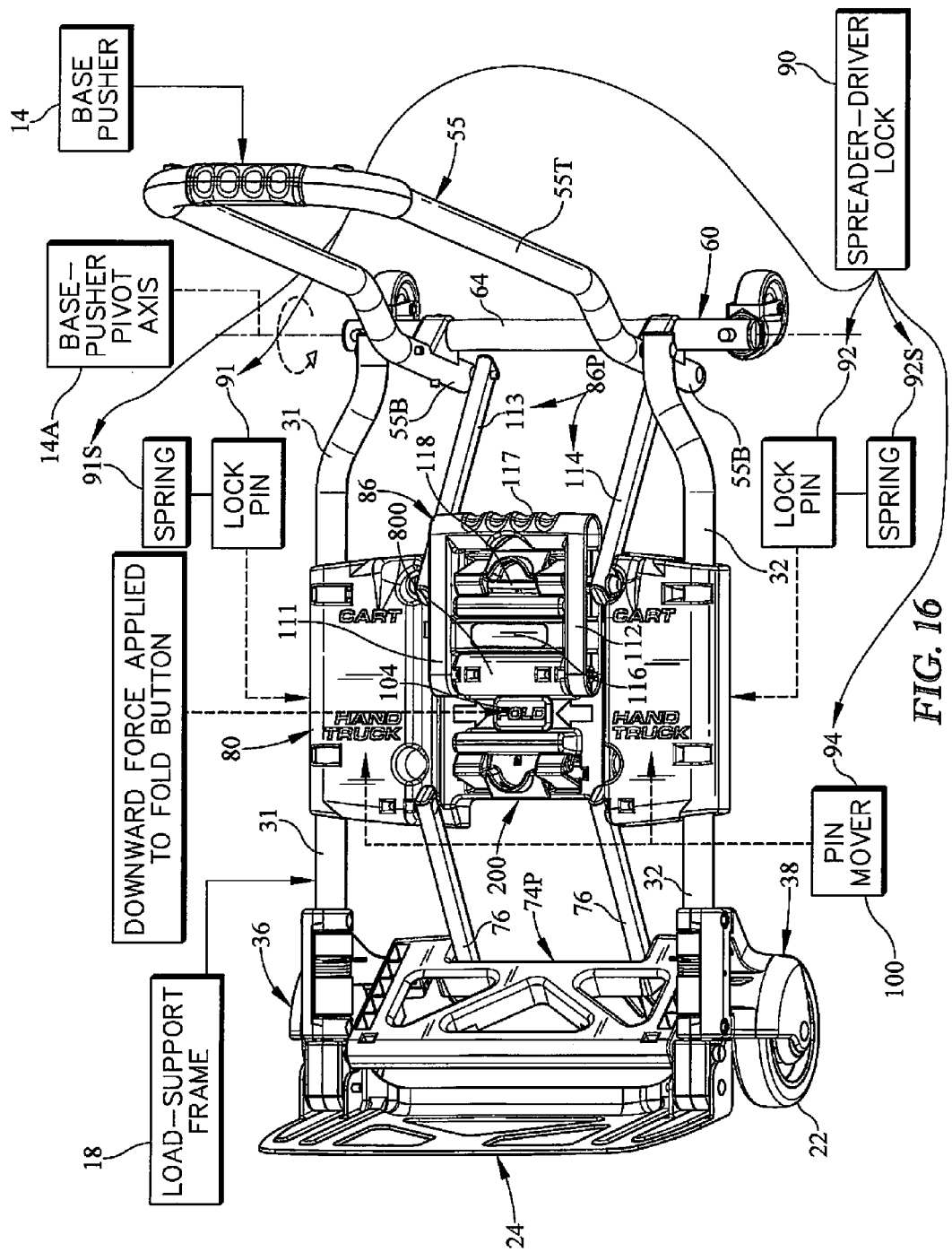

A folding sequence showing pivoting movement of base pusher 14 as load carrier 10 is changed from the front-and-rear wheel cart mode to the flat-storage mode is shown, for example in FIGS. 16-18. FIG. 16 provides an aerial perspective view looking down on the load carrier 10 in the front-and-rear wheel cart mode. FIG. 17 is a perspective view of load carrier 10 during a first stage of downward pivoting movement of base pusher 14. FIG. 18 is a perspective view of load carrier 10 during a second stage of downward pivoting movement of base pusher 14. FIG. 19 provides a perspective view of a portion of load carrier 10 as handgrip 55H of the U-shaped base pusher 14 approaches load-support frame 18 of rolling base 12.

A perspective view of a portion of load carrier 10 is provided in FIG. 20 just before an elastic finger 41 or 51 included in each of the front-wheel units 36, 38 snaps into engagement with one of the side legs 55L or 55R included in the U-shaped base pusher 14. Mating engagement of each elastic finger 41, 51 with one of the base pusher side legs 55L, 55R to retain base pusher 14 in the stored position on load-support frame 18 of rolling base 12 when load carrier 10 is placed in the flat-storage mode as shown in FIG. 21.

As suggested in FIGS. 16 and 22, a spreader-driver lock 90 includes a pair of spring-loaded slider-retainer pins 91, 92 coupled to wheel-support rails 31, 32 of load-support frame 18 that are spring-biased by springs 91S, 92S to hold slidable spreader driver 80 in place along load-support frame 18 when base pusher 114 reaches the upright cart position. The spreader-driver lock 90 also includes a pin release 94 coupled to FOLD button 104 and mounted for movement relative to the slidable spreader driver 80 to provide means for pushing the slider-retainer pins 91, 92 into the wheel-support rails 31, 32 of the load-support frame 18 and out of engagement with the slidable spreader driver 80 when the FOLD button is pushed by a user to allow the base pusher 14 to be collapsed from the upright cart position to the stored position. The spring-biased slider-retainer pins 91, 92 are received in pin-receiver apertures 91A, 92A formed in the slidable spreader driver 80 to hold the slidable spreader driver 80 in place in a stationary position relative to load-support frame 18 as shown in FIG. 22A.

Figure 23B:
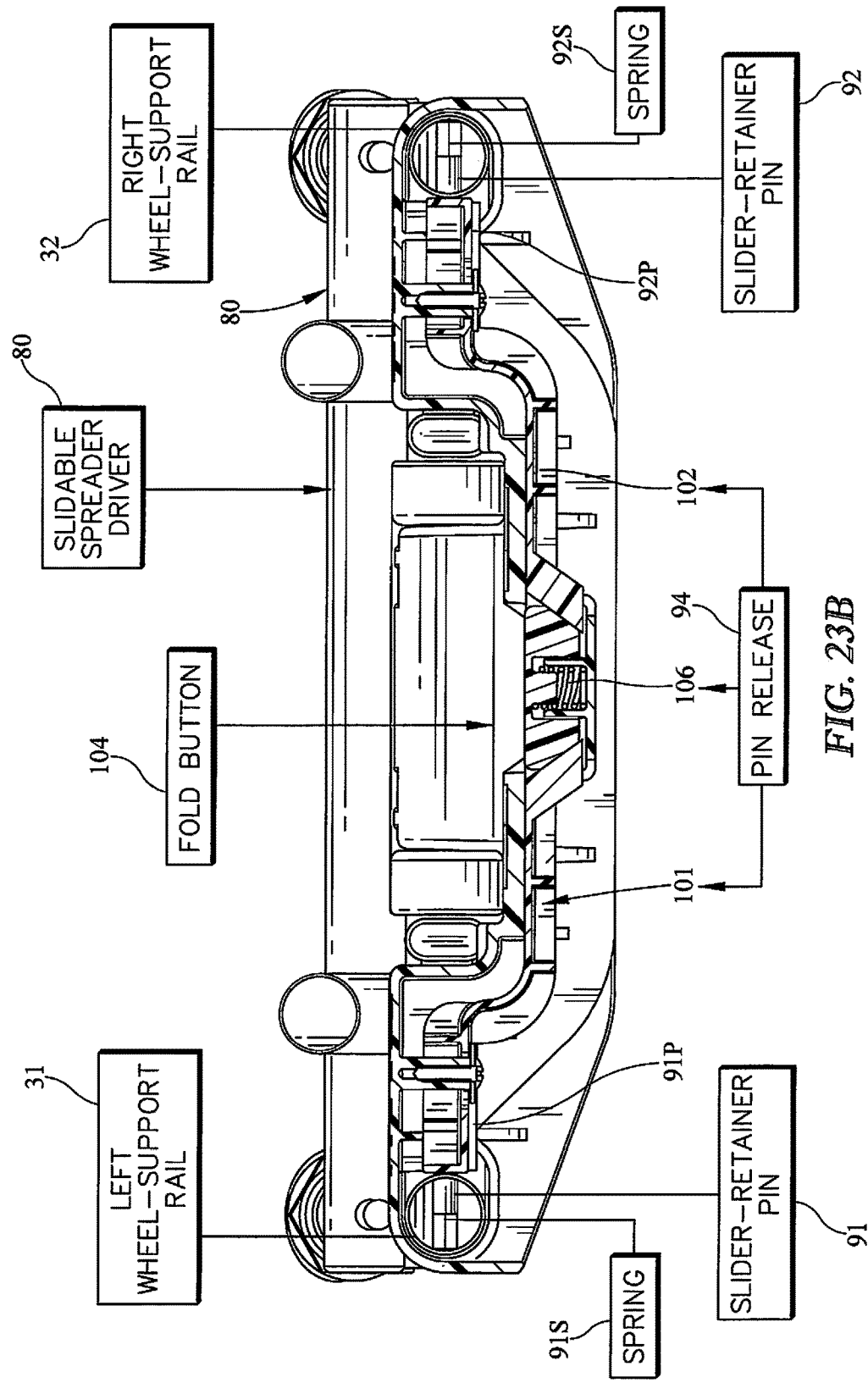
FIG. 23B is a sectional view taken along line 23B-23B of FIG. 23.

Spreader-driver lock 90 further includes a fold button 104 mounted for movement on the spreader driver 80 from a raised inactive position to a depressed activated position and a pin release 94 coupled to the fold button 104 as suggested in FIG. 23B. Pin release 94 is mounted for movement relative to the slidable spreader driver 80 to provide means for pushing the slider-retainer pin 91, 92 into the pin receiver formed in the load-support platform 18 and out of engagement with the slidable spreader driver 80 when the fold button 104 is pushed by a user to allow the base pusher 14 to be collapsed from the upright cart position to the stored position.

Crossbar 116 is arranged to interconnect the first and second pivot links 111, 112 and lie between the pusher-rotator pivot axis 86A and the anchor rod 118 as suggested in FIG. 10. Crossbar 116 is configured to provide means for covering the fold button 104 when the pivotable base-pusher rotator 86 is moved to assume the SECOND POSITION to block application of an external movement-inducing force to the fold button 104 to cause the fold button 104 to remain in the raised inactive position when the pivotable base-pusher rotator 86 occupies the SECOND POSITION and for uncovering the fold button 104 when the pivotable base-pusher rotator 86 is moved to assume the FIRST POSITION to allow application of an external movement-inducing force to the fold button 104 to free the fold button 104 to be moved to the depressed activated position when the pivotable base-pusher rotator 86 occupies the FIRST POSITION.

A user presses a FOLD button 104 included in the pin release 94 of the spreader-driver lock 90 so that the slidable spreader driver 80 is free to move relative to load-support frame 18 when base pusher 14 is collapsed from the upright cart position to the stored position as shown in FIG. 23. The pin release 94 includes pin pushers 91P, 92P that push the slider-retainer pins 91, 92 out of the pin-receiver apertures 91A, 92A formed in the slidable spreader driver 80 when the FOLD button 104 is pressed by a user as shown in FIG. 23A.

Rolling base 12 includes a load-support frame 18, a left front wheel unit 36 including a left front wheel 21, and a right front wheel unit 38 including a right front wheel 22 as shown, for example, in FIG. 2. Load-support frame 18 includes a left wheel-support rail 31, a right wheel-support rail 32, and a toe-plate shelf 24 mounted on forward ends of rails 31, 32 for pivotable movement about a shelf pivot axis 24A between an inactive flat position shown in FIGS. 1A and 1B used in the flat storage mode and the front-and-rear-wheel cart mode of load carrier 10 and an active extended position shown in FIG. 1C and used in the 2-wheel hand-truck mode of load carrier 10. Once left front wheel unit 36 is mounted on left rail 31, left front wheel unit 36 is pivotable about a left pivot axis 36A aligned with left rail 31 as suggested in FIG. 2. Once right front wheel unit 38 is mounted on right rail 32, right front wheel unit 38 is pivotable about a right pivot axis 38A aligned with right rail 32 as suggested in FIG. 2. Load-support frame 18 also includes a left end cap 33 to be mounted on a forward end of left rail 31 after left front wheel unit 36 is mounted on left rail 31 and a right end cap 34 to be mounted on a forward end of right rail 32 after right front wheel unit 38 is mounted on right rail 32.

Base pusher 14 includes a push handle 55 and an outrigger wheel unit 60 configured to be coupled to push handle 55 to move therewith as suggested, for example, in FIG. 2. Push handle 55 includes a left leg 55L, a right leg 55R, and a U-shaped handgrip 55H interconnecting upper ends of legs 55L, 55R as suggested in FIG. 2. Outrigger wheel unit 60 includes a left caster 61 including a left rear wheel 61R, a right caster 62 including a right rear wheel 62R, and a caster-support rail 64 coupled to lower ends of left and right legs 55L, 55R of base pusher 14 and to each caster 61, 62.

Mode changer 16 includes a front linkage 70 and a rear linkage 72 as suggested in FIG. 2. Front linkage 70 includes a spreader driver 80 and a wheel spreader 74 including a pivotable spreader plate 74P and wheel links 75, 76 interposed between and coupled to pivotable spreader plate 74P and spreader driver 80 as suggested in FIG. 2. Front linkage 70 also includes a spreader-driver retainer 82 that is configured to block or allow sliding movement of spreader driver 80 along wheel-support rails 31, 32 of load-support frame 18 at the option of a user. Rear linkage 72 includes a pivotable pusher rotator 86 and a push rod 86P including pusher links 113, 114 pivotably coupled at one end to pivotable base-pusher rotator 86 and at opposite ends to pivotable base pusher 14 at the lower ends of left and right legs 55L, 55R of push handle 55 below the caster-support rail 64 as suggested in FIG. 3. Base-pusher rotator 86 includes a movable handgrip 117 comprising pivot links 111, 112, a crossbar (strut) 116 interconnecting pivot links 111, 112, and an anchor rod 118 as suggested in FIG. 2.

In illustrative embodiments, the mode changer 16 is operable in the field by a user without tools to convert load carrier 16 easily from its flat storage mode to a front-and-rear-wheel cart mode or an upright 2-wheel hand-truck mode. In the flat storage mode, front wheels 20, 21 are aligned to cause their treads to face toward one another and their axes of rotation to lie in spaced-apart parallel relation to one another. In the other modes, front wheels 21, 22 are aligned to cause their treads to engage and roll on ground 35 underlying rolling base 12 and to cause front wheels 21, 22 to rotate about a common axis of rotation.

Left front wheel unit 36 includes a cam block 49 arranged to lie alongside wheel 21 and engage a portion of spreader plate 74P of wheel spreader 74 of front linkage 70 of mode changer 16 during pivoting motion of base pusher 14 about base-pusher pivot axis 14 to change the mode of load carrier 10 from the flat storage mode to the front-and-rear-wheel cart mode. Similarly, right-front wheel unit 38 includes a cam block 59 near right wheel 22.

Sliding movement of the load-carrier mode changer 16 on the left and right rails 31, 32 of the rolling base 12 to cause the front wheel units 36, 38 to pivot from the folded storage positions to the unfolded rolling positions in response to pivoting movement of the base pusher 14 from the stored position to the upright cart position is shown in FIGS. 1B and 1C. Movement of the pivotable pusher rotator 86 included in the rear linkage 72 of the load-carrier mode changer 16 from the FIRST POSITION to the SECOND POSITION causes the base pusher 14 to pivot from the upright cart position suggested in FIG. 1B to the laidback hand-truck position suggested in FIG. 3C.

Front linkage 70 of the load-carrier mode changer 16 includes a slidable spreader driver 80 coupled to the base pusher 14 via the rear linkage 72 and mounted for sliding movement on the rails 31, 32 included in the rolling base 12 and a wheel spreader 74 arranged to interconnect the slidable spreader driver 80 and the pivotable left and right front wheel units 36, 38. Spreader plate 74P of wheel spreader 74 is arranged to engage a root section of each front wheel unit 36, 38. Pivotable base-pusher rotator 86 included in the rear linkage 70 of the load-carrier mode changer 16 is coupled to the base pusher 14 and mounted for pivoting movement on the slidable spreader driver 80 and arranged to lie in a FIRST POSITION on the slidable spreader driver 80.

In illustrative embodiments, rolling base 12 comprises a load-support frame 18 including left and right front-wheel support rails 31, 32 arranged to lie in spaced-apart parallel relation to one another, a left front wheel unit 36 mounted on the left front-wheel support rail 31 for pivotable movement about a left pivot axis 36A, and a right front wheel unit 38 mounted on the right front-wheel support rail 32 for pivotable movement about a right pivot axis 30A that is arranged to lie in spaced-apart parallel relation to the left pivot axis 36A. Each of the left and right front wheel units 36, 38 may pivot about its pivot axis 36A or 38A between a folded storage position shown in FIG. 1A and an unfolded rolling position shown in FIGS. 1B and 1C. In the folded storage positions, none of the front wheels 21, 22 in the left and right front wheel units 36, 38 are arranged to engage and roll on ground 35 underlying the rolling base 12 as suggested in FIG. 1A. However, in the unfolded rolling positions, the front wheels 21, 22 are arranged to engage and roll on the ground 35 underlying the rolling base 12 as suggested in FIGS. 1B and 1C.

Load carrier 10 also includes spring means 46, 56 for normally and yieldably pivoting each front wheel unit 36, 38 about its pivot axis 36A or 38A to assume the folded storage position in which front wheels 21, 22 in the front wheel units 36, 38 disengage ground 35 underlying the rolling base 12 and the front wheel 21 in the left front wheel unit 36 is arranged to extend toward the front wheel 22 in the right front wheel unit 38. The spring means 46, 56 illustratively includes a left torsion spring 46 coupled to the left rail 31 and the left front wheel unit 36 and a right torsion spring 36 coupled to the right rail 32 and the right-front wheel unit 38.

Base pusher 14 is formed to include left and right rear wheels 61R, 62R in an illustrative embodiment as suggested in FIGS. 1A-1C, and 2. It is within the scope of this disclosure to include only one rear wheel in base pusher 14.

Base pusher 14 is mounted on the left and right front wheel-support rails 31, 32 of the rolling base 12 for pivotable movement about a base-pusher pivot axis 14A in a first direction from a stored position arranged to lie alongside the left and right front wheel-support rails 31, 32 on top of the rolling base 12 in a flat storage mode of the load carrier 10 (see FIG. 1A) first through about a 90° angle away from the left and right front wheel-support rails 31, 32 to reach an upright cart position to establish a front-and-rear-wheel cart mode of load carrier 10 (see FIG. 1B) in which the two rear wheels 61R, 62R of the base pusher 14 along with two front wheels 21, 22 in the left and right front wheel units 36, 38 roll on ground 35 underlying the load carrier 10. Then the base pusher 14 can be pivoted about the base-pusher pivot axis 14A in the same direction through about another 90° angle to reach a laidback hand-truck position in which only the two front wheels 21, 22 in the left and right front wheel units 36, 38 roll on ground 35 underlying load carrier 10 to establish a 2-wheel hand-truck mode of the load carrier 10 (see FIG. 1C).

Load carrier 10 includes a load-carrier mode changer 16 coupled to the rolling base 12 and to the base pusher 14 as suggested in FIGS. 1A-1C and 2. The load-carrier mode changer 16 is configured to provide means for pivoting the spring-biased left and right front wheel units 36, 38 about their pivot axes 36A or 38A to move relative to the left and right front-wheel support rails 31, 32 from the folded storage positions shown in FIG. 1A to assume unfolded rolling positions shown in FIG. 1B in which the front wheels 21, 22 included in the left and right front wheel units 36, 38 are arranged to engage and roll on ground 35 underlying the rolling base 12 and rotate about a common axis of rotation in response to pivoting movement of the base pusher 14 relative to the rolling base 12 about the base-pusher pivot axis 14A by a user in the field and cooperate with the rear wheels 61R, 62R included in the base pusher 14 to establish the front-and-rear-wheel cart mode of the load carrier 10.

Load-carrier mode changer 16 includes a front linkage 70 coupled to the pivotable left and right front wheel units 36, 38 and a rear linkage 72 coupled to the pivotable base pusher 14 as suggested in FIG. 2. The rear linkage 72 is always joined to the front linkage 72 to cooperate therewith to cause the pivotable left and right front wheel units 36, 38 to pivot against biasing forces provided by the spring means 46, 56 from the folded storage positions to the unfolded rolling positions in response to pivoting movement of the base pusher 14 about the base-pusher pivot axis 14A in a direction away from the front wheel units 36, 38.

In illustrative embodiments, the front linkage 70 includes a slidable spreader driver 80 mounted for sliding movement on the front-wheel support rails 31, 32 of the rolling base 12 and a wheel spreader 74 coupled to the spreader driver 80 and to the left and right front wheel units 36, 38 as suggested illustratively in FIG. 2. The rear linkage 72 includes a pivotable base-pusher rotator 86 mounted for movement on the spreader driver 80 between a FIRST POSITION and SECOND POSITION and a push rod 86P comprising pusher links 113, 114 coupled to the pivotable base-pusher rotator 86 and to the pivotable base pusher 14. Normally, the pivotable base-pusher rotator 86 is retained in the FIRST POSITION on the spreader driver 80 to cause the front wheel units 36, 38 to pivot on the rails 31, 32 from their folded storage positions to their unfolded rolling positions in response to pivoting of the base pusher 14 about the base-pusher pivot axis 144 in a direction away from the front wheel units 36, 38 so as to convert the load carrier 10 from the flat storage mode to the front-and-rear-wheel cart mode. At the option of a user, the load carrier 10 is converted from the front-and-rear-wheel cart mode to the 2-wheel hand-truck mode by moving the pivotable base-pusher rotator 86 on the spreader driver 80 from the FIRST POSITION to the SECOND POSITION to move the push rod 86P relative to the rolling base 12 to pivot the base pusher 14 about the base-pusher pivot axis 14A through an angle of about 90° from the upright cart position to the laidback hand-truck position.

Load carrier 10 is convertible by a user in the field without tools to assume a flat storage mode, a cart mode, and a 2-wheel hand-truck mode as shown in FIGS. 1A-1C. In the flat storage mode shown in FIG. 1A, a pair of front wheels 21, 22 included in a rolling base 12 are in a folded storage position and a base pusher 14 is in a stored position extending along a load-support frame 18 of the rolling base 12 so that load carrier 10 is generally flattened for storage. In the cart mode shown in FIG. 1B, front wheels 21, 22 are moved to an unfolded rolling position and base pusher 14 is moved to an upright cart position extending generally perpendicular to load-support frame 18 of rolling base 12 so that load carrier 10 provides a 2-wheeled hand truck for transporting goods. In the 2-wheel hand-truck mode shown in FIG. 1C, front wheels 21, 22 remain in the unfolded rolling position and base pusher 14 is moved to a laidback hand-truck position extending generally parallel to frame 18 of rolling base 12 so that load carrier 10 provides a two-wheeled stand-up dolly for transporting goods.

In the illustrative embodiment, load carrier 10 includes a mode changer 16 coupled to rolling base 12 and to base pusher 14 as shown in FIGS. 1A-1C. Mode changer 16 provides front-wheel mover means for pivoting front wheels 21, 22 from the folded storage position to the unfolded rolling position in response to movement of base pusher 14 from the stored position to the upright cart position as shown in FIGS. 1A and 1B. Mode changer 16 provides pusher-retainer means 200, 300 for locking the base-pusher rotator 86 to the spreader driver 80 to hold base pusher 14 in either the upright cart position or in the laidback hand-truck position relative to load-support frame 18.

Load carrier 10 illustratively includes rolling base 12, base pusher 14 coupled to rolling base 12, and load-carrier mode changer 16 as shown, for example, in FIGS. 1A-1C. Rolling base 12 is adapted for supporting goods to be transported by load carrier 10. Base pusher 14 is coupled to load-support frame 18 included in rolling base 12 near a first end 17 of load-support frame 18 for movement relative to rolling base 12 about a base-pusher pivot axis 14A and is adapted to provide a grip for a user during use of load carrier 10. Load-carrier mode changer 16 is coupled to rolling base 12 and to base pusher 14 and facilitates reconfiguration of load carrier 10 between modes by moving front wheels 21, 22 included in rolling base 12 and by holding base pusher 14 in predetermined positions relative to rolling base 12.

Rolling base 12 includes a load-support frame 18 and a toe-plate shelf 24 coupled to load-support frame 18 near second end 19 of load-support frame 18 for movement about a shelf pivot axis 24A. Toe-plate shelf 24 moves about shelf pivot axis 24A from an inactive flattened position, shown in FIG. 1B, to an active extended position shown in FIG. 1C.

Load-support frame 18 includes a left rail 31, a right rail 32 spaced apart from and arranged to extend parallel to left rail 31, a left end cap 33 sized to receive and to be coupled to left rail 31, and a right end cap 34 sized to receive and to be coupled to right rail 32 as shown in FIGS. 2 and 3. Left front wheel 21 is coupled to left rail 31 for movement about left wheel axis 36A which extends along left rail 31. Right front wheel 22 is coupled to right rail 32 for movement about right wheel axis 38A which extends along right rail 32 so that right wheel axis 38A is spaced apart from and arranged to extend parallel to left wheel axis 36A. Toe-plate shelf 24 is coupled to left and right end caps 33, 34 of load-support frame 18 for movement about shelf pivot axis 24A.

Left front wheel unit 36 is coupled to left rail 31 of load-support frame 18 and a right front wheel unit 38 is coupled to right rail 32 of load-support frame 18 as shown in FIG. 4. Left front wheel unit 36 includes left front wheel 21 and couples left front wheel 21 to left rail 31 of load-support frame 18 for movement about left wheel axis 36A. Right front wheel unit 38 includes right front wheel 22 and couples right front wheel 22 to right rail 32 of load-support frame 18 for movement about right wheel axis 38A. Front wheels 21, 22 move about wheel axes 36A, 38A from the folded storage positions, shown in FIG. 1A, to the unfolded rolling positions shown in FIGS. 1B and 1C. Movement of front wheels 21, 22 is independent of movement of toe-plate shelf 24.

In the folded storage positions, front wheels 21, 22 are arranged to extend inwardly toward one another to cause load carrier 10 to be flattened as shown in FIG. 1A. More specifically, left front wheel 21 is arranged to extend from left rail 31 toward right front wheel 22 and right rail 32 of load-support frame 18 when in the folded storage position. Correspondingly, right front wheel 22 is arranged to extend from right rail 32 toward left front wheel 21 and left rail 31 of load-support frame 18 when in the folded storage position.

In the unfolded rolling position, front wheels 21, 22 are arranged to extend downwardly to engage a floor 35 underlying load carrier 10 as shown in FIGS. 1B and 1C. More specifically, left front wheel 21 and right front wheel 22 are arranged to extend in the same downward direction away from load-support frame 18 when in the unfolded rolling position.

Left front wheel unit 36 includes a brace bracket 42 coupled left rail 31, a wheel support 44 coupled to left rail 31 for movement about left wheel axis 36A, and a left front wheel 21 coupled to wheel support 44 as suggested in FIG. 2. A wheel-bias spring 46 is coupled to left rail 31 and to wheel support 44. Wheel support 44 includes a rail receiver 47, a fork 48, and a cam block 49 as shown in FIG. 2. Wheel-bias spring 46 is arranged to extend around a portion of left rail 31 and to engage brace bracket 42 and wheel support 44 to bias wheel support 44, along with left front wheel 21, toward the folded storage position as shown in FIG. 1A.

Wheel support 44 of left front wheel unit 36 is illustratively a monolithic component formed to include a rail receiver 47, a fork 48, a cam block 49, and a hook 41 as shown in FIG. 2. Rail receiver 47 is coupled to left rail 31. Fork 48 is coupled to rail receiver 47 and is configured to support left front wheel 21 for rotation relative to wheel support 44. Cam block 49 is coupled to fork 48 and interacts with spreader plate 74P of wheel spreader 74 of front linkage 70 of load-carrier mode changer 16 when left front wheel 21 is moved from the folded storage position to the unfolded rolling position. Hook 41 extends from cam block 49 and is configured to receive base pusher 14 when base pusher 14 is in the stored position as shown in FIG. 1A so that base pusher 14 is held in place relative to rolling base 12.

Right front wheel unit 38 is similar to left front wheel unit 36 and includes a brace bracket 52 coupled right rail 32, a wheel support 54 coupled to right rail 32 for movement about right wheel axis 38A, and a right front wheel 22 coupled to wheel support 54. A wheel-bias spring 56 is coupled to right rail 32 and to wheel support 54. Wheel-bias spring 56 is arranged to extend around a portion of right rail 32 and to engage brace bracket 52 and wheel support 54 to bias wheel support 54, along with right front wheel 22, toward the folded storage position as shown in FIG. 1A.

Wheel support 54 of right front wheel unit 38 illustratively is a monolithic component formed to include a rail receiver 57, a fork 58, a cam block 59, and a hook 51 as shown in FIG. 2. Rail receiver 57 is coupled to right rail 32. Fork 58 is coupled to rail receiver 57 and is configured to support right front wheel 22 for rotation relative to wheel support 54. Cam block 59 is coupled to fork 58 and interacts with spreader plate 74P of wheel spreader 74 of load-carrier mode changer 16 when right front wheel 22 is moved from the folded storage position to the unfolded rolling position. Hook 51 extends from cam block 59 and is configured to receive base pusher 14 when base pusher 14 is in the collapsed storage position as shown in FIG. 1A so that base pusher 14 is held in place relative to rolling base 12.

Base pusher 14 illustratively includes a push handle 55 and an outrigger wheel unit 60 as shown, for example, in FIG. 2. Push handle 55 is coupled to load-support frame 18 of rolling base 12 for movement about base-pusher pivot axis 14A. Outrigger wheel unit 60 is coupled to push handle 55 for movement with push handle 55 about base-pusher pivot axis 14A and illustratively includes a left caster 61, a right caster 62, and a caster-support rail 64 arranged to interconnect left caster 61 and right caster 62. Base pusher 14 pivots about base-pusher pivot axis 14A from the stored position, shown in FIG. 1A, to the upright cart position, shown in FIG. 1B, and to the laidback hand-truck position shown in FIG. 1C.

In the stored position shown in FIG. 1A, base pusher 14 is arranged to extend along load-support frame 18 of the rolling base 12 to cause load carrier 10 to be generally flattened for storage. More specifically, push handle 55 of base pusher 14 is arranged to extend over a portion of load-support frame 18 when base pusher 14 is in the stored position. Outrigger wheel unit 60 is arranged to lie generally outward of first end 17 of load-support frame 18 to cause left and right casters 61, 62 to lie in a plane defined by load-support frame 18 when base pusher 14 is in the stored position.

In the upright cart position shown in FIG. 2, base pusher 14 is arranged to extend generally perpendicular to load-support frame 18 of rolling base 12 to cause load carrier 10 to provide a four-wheeled cart for transporting goods as shown in FIG. 1B. Push handle 55 is arranged to extend upwardly from load-support frame 18 away from an underlying floor 35 when base pusher 14 is in the upright cart position. Outrigger wheel unit 60 is arranged to extend downwardly from load-support frame 18 to cause left and right casters 61, 62 to engage an underlying floor 35 when base pusher 14 is in the upright cart position.

In the laidback hand-truck position show in FIG. 1C, base pusher 14 is arranged to extend generally parallel to load-support frame 18 of rolling base 12 to cause load carrier 10 to provide a two-wheeled stand-up dolly for transporting goods as shown in FIG. 1C. Push handle 55 is arranged to extend generally parallel to and away from first end 17 of load-support frame 18 when base pusher 14 is in the laidback hand-truck position. Outrigger wheel unit 60 is arranged to extend generally parallel to and toward second end 19 of load-support frame 18 when base pusher 14 is in the laidback hand-truck position.

Load-carrier mode changer 16 illustratively includes a front linkage 70 and a rear linkage 72 as shown in FIG. 2. Front linkage 70 is configured to move front wheels 21, 22 from the folded storage position to the unfolded rolling position in response to movement of base pusher 14 from the stored position to the upright cart position. Rear linkage 72 is configured to hold base pusher 14 in either the upright cart position or in the laidback hand-truck position relative to load-support frame 18.

Front linkage 70 illustratively includes a wheel spreader 74 comprising a spreader plate 74P and wheel links 75, 76, and a slidable spreader driver 80 as shown in FIG. 2. Spreader plate 74P of wheel spreader 74 is configured to engage cam blocks 49, 59 of left and right front wheel units 36, 38 to push units 36, 38 and front wheels 21, 22 in those units 36, 38 from the folded storage position to the unfolded rolling position as shown in FIGS. 10 and 11. Spreader plate 74P of wheel spreader 74 is received in LOCK (channel) sections 493, 593 formed in hooks 41, 51 attached to corresponding front wheels 21, 22 when front wheels 21, 22 are moved to the unfolded-rolling position to hold the front wheels 21, 22 in the unfolded-rolling position and to brace the front wheels 21, 22 during use of the load carrier 10. Wheel links 75, 76 are pivotably coupled to spreader plate 74P to pivot relative to spreader plate 74P and to slidable spreader driver 80 to pivot relative to slidable spreader driver 80. Slidable spreader driver 80 is coupled to load-support frame 18 to slide along load-support frame 18.

Rear linkage 72 includes a spreader-driver retainer 82, pivotable pusher rotator 86, and push rod 86P, as shown, for example, in FIG. 2. Slidable spreader driver 80 is coupled to load-support frame 18 to slide relative to load-support frame 18 and to base pusher 14 through rear linkage 72. Slidable spreader driver 80 facilitates movement of base pusher 14 from the stored position to the upright cart position. Spreader-driver retainer 82 is configured to block or allow movement of slidable spreader driver 80 along load-support frame 18. Rear linkage 72 is coupled to slidable spreader driver 80 and to base pusher 14 to interconnect slidable spreader driver 80 and base pusher 14. Rear linkage 72 facilitates movement of base pusher 14 relative to slidable spreader driver 80 and load-support frame 18 from the upright cart position to the laidback hand-truck position.

Spreader-driver lock 90 illustratively includes a left slider-retainer pin 91 coupled to spring 91S, a right slider-retainer pin 92 coupled to spring 92S, and a pin release 94 as shown in FIG. 3. Left slider-retainer pin 91 is coupled to left rail 31 of load-support frame 18 and right slider-retainer pin 92 is coupled to right rail 32 of load-support frame 18. Left and right slider-retainer pins 91, 92 extend into corresponding left and right pin receivers 91A, 92A formed in rails 31, 32 of slidable spreader driver 80 when base pusher 14 is moved to the upright cart position from the stored position as shown in FIGS. 22 and 22A. When slider-retainer pins 91, 92 are received in pin receivers 91A, 92A, slidable spreader driver 80 is blocked from movement along load-support frame 18. Pin release 94 is configured to push slider-retainer pins 91, 92 out of pin receivers 91A, 92A in response to downward movement of FOLD button 104 relative to spreader driver 80 when a user is ready to move base pusher 14 back from the upright cart position to the stored position.

Figure 22B:
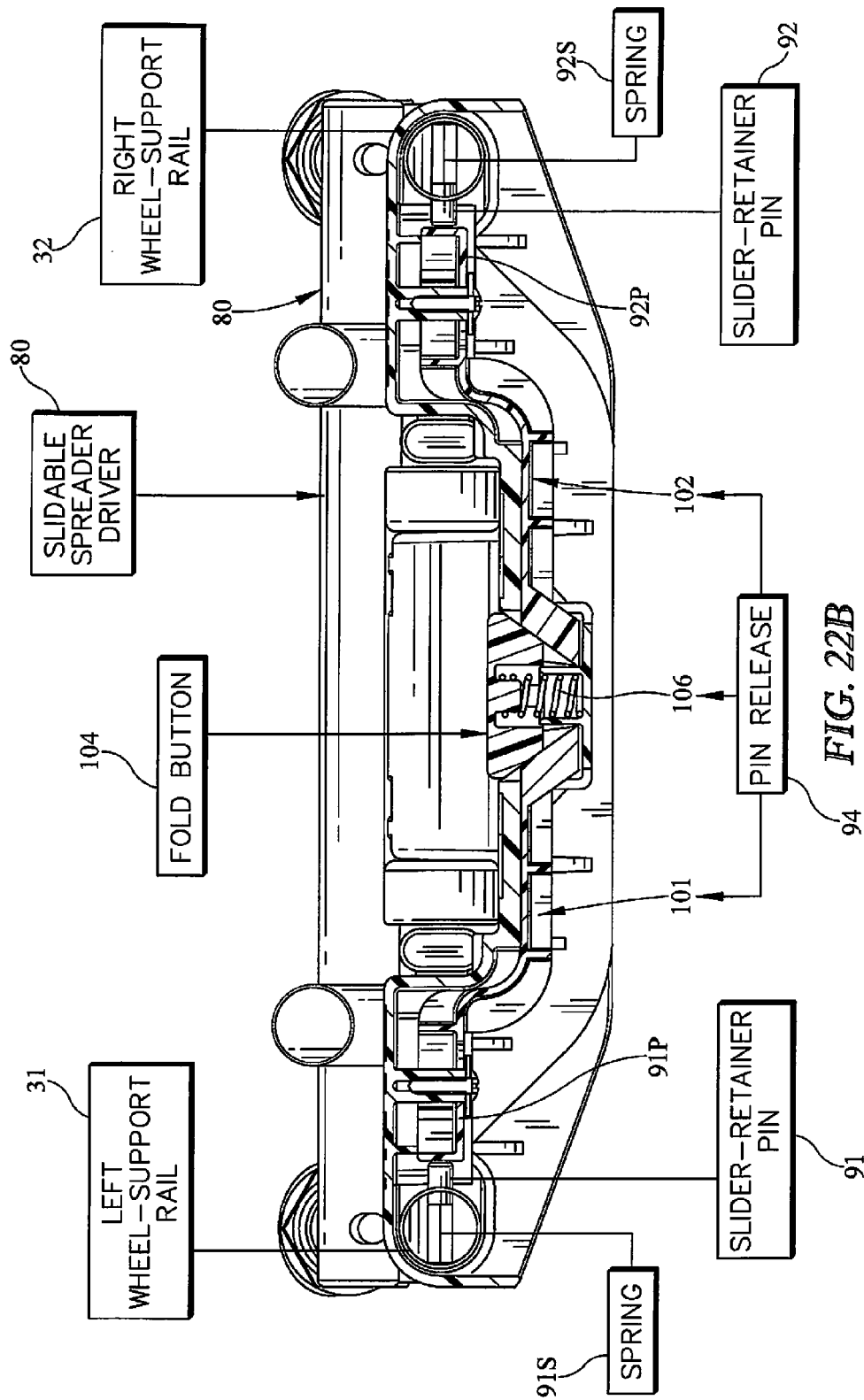
FIG. 22B is a sectional view taken along line 22B-22B of FIG. 22.

Pin release 94 is coupled for lost-motion movement relative to FOLD button 104 and illustratively includes left and right pin pushers 101, 102 and a bias spring 106 as shown in FIGS. 3, 22B, and 23B. Left and right pin pushers 101, 102 are mounted to slidable spreader driver 80 to slide outwardly in response to a user pressing button 104 to cause slider-retainer pins 91, 92 to be pushed out of pin receivers 91A, 92A formed in slidable spreader driver 80 as shown, for example in FIGS. 22, 22A, 22B, 23, 23A, and 23B. FOLD button 104 is coupled to slidable spreader driver 80 for movement relative to slidable spreader driver 80 from a disengaged position allowing left and right pin pushers 101, 102 to be moved inwardly by slider retainer pins 91, 92 to an engaged position pushing left and right pin pusher 101, 102 outwardly. Bias spring 106 is arranged to lie between slidable spreader driver 80 and FOLD button 104 to bias FOLD button 104 to the disengaged position.

Rear linkage 72 includes slider links 111, 112 and pusher links 113, 114 as shown in FIG. 2. Slider links 111, 112 are coupled to slidable spreader driver 80 to pivot relative to slidable spreader driver 80. Pusher links 113, 114 are pivotably coupled to both a corresponding slider link 111, 112 and base pusher 14 to pivot relative to both the corresponding slider link 111, 112 and base pusher 14. Base-pusher rotator 86 of rear linkage 72 moves between a FIRST POSITION when base pusher 14 is in the upright cart position and a SECOND POSITION when base pusher 14 is in the laidback hand-truck position. When the base-pusher rotator 86 is in the FIRST POSITION, slider links 111, 112 extend from slidable spreader driver 80 toward the base pusher 14 as shown in FIG. 10. When the pusher rotator 86 is in the SECOND POSITION, slider links 111, 112 extend from slidable spreader driver 80 away from the base pusher 14 as shown in FIG. 15.

To move load carrier 10 from flat-storage mode to cart-pusher mode, as shown in FIGS. 1A-1C, a user pivots base pusher 14 about base-pusher pivot axis 14A from the stored position to the upright cart position. In response to movement of base pusher 14, slidable spreader driver 80 is moved along load-support frame 18 in a forward direction until spreader-driver retainer 82 blocks further movement of slidable spreader driver 80 along load-support frame 18. Also, in response to movement of base pusher 14, front wheels 21, 22 are moved about axes 36A, 38A to move from the folded storage positions to the unfolded rolling positions. The user may also move toe-plate shelf 24 to the active extended position from the inactive flat position if it is desired.

To move load carrier 10 from 4-wheel cart mode to 2-wheel hand-truck mode, a user moves the pusher rotator 86 from the FIRST POSITION to the SECOND POSITION to cause base pusher 14 to pivot about base-pusher pivot axis 14A in the first direction from the upright cart position to the laidback hand-truck position. The user may also move toe-plate shelf 24 to the active extended position from the inactive flat position if not already so moved.

To move load carrier 10 from 2-wheel hand-truck mode to the 4-wheel cart mode, a user moves pusher rotator 86 from the SECOND POSITION to the FIRST POSITION. This movement causes base pusher 14 to pivot about pusher axis 14A from the laidback hand-truck position to the upright cart position.

To move load carrier 10 from the 4-wheel cart mode to the flat storage mode, a user first moves the toe-plate shelf 24 to the flat position if it was moved to the extended position previously. Next, the user presses FOLD button 104. In response to the user pressing FOLD button 104, pin pushers 101, 102 are moved outward and push slider-retainer pins 91, 92 out of slidable spreader driver 80 to free slidable spreader driver 80 to move along load-support frame 18. The user then pivots base pusher 14 about base-pusher pivot axis 14A from the upright cart position to the stored position. As base pusher 14 moves from the upright cart position to the stored position, front linkage 70 allows wheel-bias springs 46, 56 to move front wheels 21, 22 from the unfolded rolling positions to the folded storage positions.

The invention claimed is:

1. A collapsible load carrier comprising
a rolling base including a load-support frame and left and right front wheel units coupled to the load-support frame and arranged to roll on ground underlying the rolling base,
a base pusher mounted for pivotable movement relative to the load-support frame of the rolling base about a base-pusher pivot axis from a stored position arranged to lie alongside and on top of the load-support frame of the rolling base and associated with a flat storage mode of the load carrier in a first direction through a first pivot angle to an upright cart position associated with a front-and-rear-wheel cart mode of the load carrier wherein a rear wheel included in the base pusher is arranged to engage and roll on ground underlying the rolling base and further in the first direction through a second pivot angle to a two-wheel laidback hand-truck position to lie in generally coplanar relation to the load-support frame of the rolling base to define an included angle of 180° therebetween to establish a 2-wheel hand-truck mode of the load carrier in which any rear wheel in the base pusher is disengaged from ground underlying the rolling base and the rolling base is supported for rolling movement only on front wheels included in the left and right front wheel units, and
a load-carrier mode changer including a rotator-support platform mounted on the load-support frame and a rear linkage coupled to the base pusher and to the rotator-support platform, wherein the rear linkage includes a pivotable base-pusher rotator mounted on the rotator-support platform for pivotable movement about a pusher-rotator pivot axis from a first position associated with the front-and-rear-wheel cart mode of the load carrier to a second position associated with the 2-wheel hand-truck mode of the load carrier, a push rod mounted for movement relative to the pivotable base-pusher rotator and to the base pusher and configured to move the base pusher relative to the load carrier from the two-wheel laidback hand-truck position to the upright cart position in response to pivoting movement of the pivotable base-pusher rotator about the pusher-rotator pivot axis from the first position to the second position, a forward hand-truck lock coupled to the rotator-support platform and configured to engage the pivotable base-pusher rotator when the pivotable base-pusher rotator is moved to assume the first position to retain the pivotable base-pusher rotator in the first position so as to retain the base pusher in the upright cart position, and an aft cart lock coupled to the rotator-support platform to lie in spaced-apart relation to the forward hand truck lock and configured to engage the pivotable base-pusher rotator when the pivotable base-pusher rotator is moved to assume the second position to retain the pivotable base-pusher rotator in the second position so as to retain the base pusher in the two-wheel laidback hand-truck position.

2. The load carrier of claim 1, wherein the base pusher includes a top portion having a handgrip and extending upwardly above the base-pusher pivot axis and a bottom portion extending downwardly below the base-pusher pivot axis, the load-support frame is pivotably coupled to the top portion of the base pusher, and the push rod is pivotably coupled to the bottom portion of the base pusher.

3. The load carrier of claim 1, wherein the forward hand-truck lock is mounted on a forward portion of the rotator-support platform to lie between the left and right front wheel units and the pusher-rotator pivot axis and to pivot about a forward lock pivot axis relative to the rotator-support platform to engage and retain the pivotable base-pusher rotator in the second position on the rotator-support platform and wherein the aft cart lock is mounted on a rearward portion of the rotator-support platform to lie between the pusher-rotator pivot axis and the base-pusher pivot axis and to pivot about an aft lock pivot axis relative to the rotator-support platform to engage and retain the pivotable base-pusher rotator in the first position on the rotator-support platform.

4. The load carrier of claim 3, wherein base-pusher rotator includes a horizontally extending anchor rod that is arranged to lie in spaced-apart relation to the pusher-rotator pivot axis and the pivotable base-pusher rotator is arranged to be engaged by the forward hand-truck lock to retain the pivotable base-pusher rotator in the second position and is also arranged to be engaged by the aft cart lock to retain the pivotable base-pusher rotator in the first position.

5. The load carrier of claim 4, wherein the aft cart lock includes a pivotable rod retainer mounted for pivotable movement on the rearward portion of the rotator-support platform between a locked position wherein the anchor rod is trapped between the pivotable rod retainer and the rearward portion of the rotator-support platform to retain the pivotable base-pusher rotator in the first position and an unlocked position wherein the anchor rod is released to allow pivoting movement of the pivotable base-pusher rotator from the first position to the second position, a spring coupled to the rotator-support platform and arranged to yieldably urge the pivotable rod retainer normally to the locked position, and a cam ramp coupled to the pivotable rod retainer and arranged to intercept the anchor rod during pivoting movement of the pivotable base-pusher rotator from the second position to the first position, wherein the cam ramp is configured to provide means for pivoting the pivotable rod retainer against the spring from the locked position to the unlocked position due to camming engagement of the anchor rod on the cam ramp during pivotable movement of the pivotable base-pusher rotator from the second position to the first position so that the anchor rod can be moved to assume a trapped position between the pivotable rod retainer and the rearward portion of the rotator-support platform to retain the pivotable base-pusher rotator in the first position.

6. The load carrier of claim 5, wherein the aft cart lock further includes a rearward-portion retainer stop coupled to the rearward portion of the rotator-support platform and arranged to extend upwardly away from the load-support frame to provide means for limiting pivotable movement of the pivotable rod retainer toward the forward hand-truck lock in response to exposure of the pivotable rod retainer to movement-inducing torque generated by the spring to establish the locked position of the pivotable rod retainer.

7. The load carrier of claim 5, wherein the forward hand-truck lock further includes a forward-portion retainer stop coupled to the forward portion of the rotator-support platform and arranged to extend upwardly away from the load-support frame to provide means for limiting pivotable movement of the pivotable rod retainer toward the aft cart lock in response to exposure of the pivotable rod retainer to movement-inducing torque generated by the spring to establish the locked position of the pivotable rod retainer.

8. The load carrier of claim 7, wherein the pivotable base-pusher rotator also includes first and second pivot links arranged to lie in spaced-apart relation to one another and mounted for pivotable movement about the pusher-rotator pivot axis and a rotator handgrip coupled to free ends of the first and second pivot links, the anchor rod is arranged to interconnect the first and second pivot links and to lie between the pusher-rotator pivot axis and the rotator handgrip, and the pivotable base-pusher-rotator also includes a crossbar arranged to interconnect the first and second pivot links and lie between the pusher-rotator pivot axis and the anchor rod and to lie in and fill a space provided between the forward-portion stop and the pusher-rotator pivot axis to provide means for blocking access to a fold button that is mounted for movement in the forward portion of the rotator-support platform and operable to initiation collapse of the load carrier to regulate movement of the base pusher from the front-and-rear-wheel cart position to the stored position.

9. The load carrier of claim 4, wherein the forward hand-truck lock includes a pivotable rod retainer mounted for pivotable movement on the forward portion of the rotator-support platform between a locked position wherein the anchor rod is trapped between the pivotable rod retainer and the forward portion of the rotator-support platform to retain the pivotable base-pusher rotator in the second position and an unlocked position wherein the anchor rod is released to allow pivoting movement of the pivotable base-pusher rotator from the second position to the first position, a spring coupled to the rotator-support platform and arranged to yieldably urge the pivotable rod retainer normally to the locked position, and a cam ramp coupled to the pivotable rod retainer and arranged to intercept the anchor rod during pivoting movement of the pivotable base-pusher rotator from the first position to the second position, wherein the cam ramp is configured to provide means for pivoting the pivotable rod retainer against the spring from the locked position to the unlocked position due to camming engagement of the anchor rod on the cam ramp during pivotable movement of the pivotable base-pusher rotator from the first position to the second position so that the anchor rod can be moved to assume a trapped position between the pivotable rod retainer and the forward portion of the rotator-support platform to retain the pivotable base-pusher rotator in the second position.

10. The load carrier of claim 4, wherein the pivotable base-pusher rotator also includes first and second pivot links arranged to lie in spaced-apart relation to one another and mounted for pivotable movement about the pusher-rotator pivot axis and a rotator handgrip coupled to free ends of the first and second pivot links and wherein the anchor rod is arranged to interconnect the first and second pivot links and to lie between the pusher-rotator pivot axis and the rotator handgrip.

11. The load carrier of claim 1, wherein pivotable base-pusher rotator includes a horizontally extending anchor rod that is arranged to lie in spaced-apart relation to the pusher-rotator pivot axis, the pivotable base-pusher rotator is arranged to be engaged by the forward hand-truck lock to retain the pivotable base-pusher rotator in the second position and is also arranged to be engaged by the aft cart lock to retain the pivotable base-pusher rotator in the first position, the pivotable base-pusher rotator also includes first and second pivot links arranged to lie in spaced-apart relation to one another and mounted for pivotable movement about the pusher-rotator pivot axis and a rotator handgrip coupled to free ends of the first and second links, and the anchor rod is arranged to interconnect the first and second pivot links and to lie between the pusher-rotator pivot axis and the rotator handgrip.

12. The load carrier of claim 11, wherein the push rod includes a first pusher link having an inner end that is pivotably coupled to the first pivot link at a first pivot axis and an outer end that is pivotably coupled to the base pusher.

13. The load carrier of claim 12, wherein the anchor rod includes an inner portion arranged to lie between the first and second pivot links and an outer portion arranged to extend in a direction away from the first and second pivot links to mate with the first pusher link at the first pivot axis.

14. The load carrier of claim 12, wherein the base pusher includes a top portion having a pusher handgrip and extending upwardly above the base-pusher pivot axis and a bottom portion extending downwardly below the base-pusher pivot axis and wherein the outer end of the first pusher link is pivotably coupled to the bottom portion of the base pusher at a link pivot axis.

15. The load carrier of claim 14, wherein the load-support frame is pivotably coupled to the top portion of the base pusher to cause the base-pusher pivot axis to lie between the link pivot axis and the pusher handgrip.

16. The load carrier of claim 1, wherein the rotator-support platform is a slidable spreader driver that is mounted for sliding movement on the load-support frame to cause the pivotable base-pusher rotator to move back and forth relative to the load-support frame of the rolling base as the slidable spreader driver slides on the load-support frame, the load-carrier mode changer further includes a wheel spreader coupled to the slidable spreader driver and arranged to engage a cam provided on each of the left and right front wheel units to move the left and right front wheels relative to the load-support frame from folded storage positions to unfolded rolling positions in response to movement of the base pusher about the base-pusher pivot axis in the first direction to move, in unison, the rear linkage, the slidable spreader driver, and the wheel spreader as a unit toward the front wheels so that the front wheels in the left and right wheel units are spread apart to cause the front wheels in the left and right front wheels to rotate about a common axis and on ground underlying the rolling base.

17. The load carrier of claim 16, further comprising a spreader-driver lock including a slider-retainer pin and a companion spring configured to provide means for yieldably urging the slider-retainer pin to engage a pin receiver formed in the spreader driver to hold the slidable spreader driver in a stationary position on the load-support frame when the base pusher reaches the upright cart position.

18. The load carrier of claim 17, wherein the spreader-driver lock further includes a fold button mounted for movement on the spreader driver from a raised inactive position to a depressed activated position and a pin release coupled to the fold button and mounted for movement relative to the slidable spreader driver to provide means for pushing the slider-retainer pin into the pin receiver formed in the load-support platform and out of engagement with the slidable spreader driver when the fold button is pushed by a user to allow the base pusher to be collapsed from the upright cart position to the stored position.

19. The load carrier of claim 18, wherein the pivotable base-pusher rotator includes first and second pivot links arranged to lie in spaced-apart relation to one another and mounted for pivotable movement about the pusher-rotator pivot axis, a rotator handgrip coupled to free ends of the first and second links, an anchor rod arranged to interconnect the first and second pivot links and to lie between the pusher-rotator pivot axis and the rotator handgrip, and a crossbar arranged to interconnect the first and second pivot links and lie between the pusher-rotator pivot axis and the anchor rod, and wherein the crossbar is configured to provide means for covering the fold button when the pivotable base-pusher rotator is moved to assume the second position to block application of an external movement-inducing force to the fold button to cause the fold button to remain in the raised inactive position when the pivotable base-pusher rotator occupies the second position and for uncovering the fold button when the pivotable base-pusher rotator is moved to assume the first position to allow application of an external movement-inducing force to the fold button to free the fold button to be moved to the depressed activated position when the pivotable base-pusher rotator occupies the first position.

20. The load carrier of claim 16, wherein the base pusher includes a top portion having a pusher handgrip and extending upwardly above the base-pusher pivot axis and a bottom portion extending downwardly below the base-pusher pivot axis, the load-support frame is pivotably coupled to the top portion of the base pusher, and the push rod is pivotably coupled to the bottom portion of the base pusher.

21. The load carrier of claim 16, wherein the pivotable base-pusher rotator and the push rod cooperate while the pivotable base-pusher rotator remains in the first position owing to engagement of the aft cart lock and the pivotable base-pusher rotator to convert pivoting motion of the base pusher about the base-pusher pivot axis from the stored position to the upright cart position into sliding motion of the slidable spreader driver on the load-support frame in a direction toward the front wheels to urge the wheel spreader into camming engagement with the left and right front wheel units to move those wheel units from their folded storage positions to their unfolded rolling positions.

22. The load carrier of claim 21, wherein the pivotable base-pusher rotator is coupled for pivotable movement to an inner end of the push rod and an opposite outer end of the push rod is coupled for pivotable movement to the base pusher and the push rod is configured to provide means for pivoting the base pusher automatically about the base-pusher pivot axis relative to the load-support frame of the rolling base in response to manual pivoting of the pivotable base-pusher rotator about the pusher-rotator pivot axis.

23. The load carrier of claim 1, wherein the pivotable base-pusher rotator is coupled for pivotable movement to an inner end of the push rod and an opposite outer end of the push rod is coupled for pivotable movement to the base pusher and the push rod is configured to provide means for pivoting the base pusher automatically about the base-pusher pivot axis relative to the load-support frame of the rolling base in response to manual pivoting of the pivotable base-pusher rotator about the pusher-rotator pivot axis.

24. The load carrier of claim 23, wherein the base pusher includes a top portion having a handgrip and extending upwardly above the base-pusher pivot axis and a bottom portion extending downwardly below the base-pusher pivot axis, the load-support frame is pivotably coupled to the top portion of the base pusher, and the push rod is pivotably coupled to the bottom portion of the base pusher.

25. The load carrier of claim 1, wherein the base pusher includes a top portion having a pusher handgrip and extending upwardly above the base-pusher pivot axis and a bottom portion extending downwardly below the base-pusher pivot axis and wherein an outer end of the push rod is pivotably coupled to the bottom portion of the base pusher.

26. The load carrier of claim 1, wherein the pivotable base-pusher rotator includes first and second pivot links arranged to lie in spaced-apart relation to one another and mounted for pivotable movement about the pusher-rotator pivot axis and a rotator handgrip coupled to free ends of the first and second pivot links and an inner end of the push rod is pivotably coupled to at least one of the first and second links.

27. The load carrier of claim 26, wherein the push rod includes a first pusher link having an inner end that is pivotably coupled to the first pivot link at a first pivot axis and an outer end that is pivotably coupled to the base pusher.

* * * * *